(12) United States Patent
Bruguera

(10) Patent No.: US 11,119,731 B2
(45) Date of Patent: Sep. 14, 2021

(54) APPARATUS AND METHOD FOR ROUNDING

(71) Applicant: Arm Limited, Cambridge (GB)

(72) Inventor: Javier Diaz Bruguera, Austin, TX (US)

(73) Assignee: ARM LIMITED, Cambridge (GB)

( * ) Notice: Subject to any disclaimer, the term of this patent is extended or adjusted under 35 U.S.C. 154(b) by 75 days.

(21) Appl. No.: 16/550,565

(22) Filed: Aug. 26, 2019

(65) Prior Publication Data

US 2020/0293281 A1 Sep. 17, 2020

Related U.S. Application Data

(63) Continuation-in-part of application No. 16/299,322, filed on Mar. 12, 2019.

(51) Int. Cl.
G06F 7/499 (2006.01)
G06F 7/48 (2006.01)

(52) U.S. Cl.
CPC ........ *G06F 7/49947* (2013.01); *G06F 7/4824* (2013.01)

(58) Field of Classification Search
CPC ........ G06F 7/4824; G06F 7/4873; G06F 7/49; G06F 7/5525; G06F 7/537
See application file for complete search history.

(56) References Cited

U.S. PATENT DOCUMENTS

| 5,113,363 A | 5/1992 | Orsino |
| 5,404,324 A * | 4/1995 | Colon-Bonet .......... G06F 7/535 708/500 |
| 2003/0009501 A1* | 1/2003 | Peter Tang .......... G06F 7/49947 708/551 |
| 2006/0129623 A1 | 6/2006 | Uesugi |
| 2017/0344342 A1 | 11/2017 | Bruguera |

OTHER PUBLICATIONS

Ercegovac, et al., "ON-the-Fly Rounding", pp. 1497-1503. (Year: 1992).*
Ercegovac, et al., "ON-the-Fly Rounding for Division and Square Root", pp. 169-173. (Year: 1989).*
U.S. Appl. No. 16/299,322, filed Mar. 12, 2019, Bruguera.

(Continued)

*Primary Examiner* — Chuong D Ngo
(74) *Attorney, Agent, or Firm* — Nixon & Vanderhye, P.C.

(57) ABSTRACT

A data processing apparatus is provided to convert a plurality of signed digits to an output value. Receiver circuitry receives, at each of a plurality of iterations, one of the plurality of signed digits, each of the signed digits comprising a number of bits dependent on a radix. The signed digits being used to form an unrounded output value followed by zero or more extra bits. Adjustment circuitry adjusts a least-significant digit of the unrounded output value to produce an incremented unrounded output value after the plurality of iterations. Rounding circuitry selects from among the unrounded output value and the incremented unrounded output value to produce the output value. The adjustment circuitry is adapted, when a value of a position of a least-significant bit of the unrounded output value is greater than or equal to the radix divided by two, to adjust a subset of the digits of the unrounded output value.

20 Claims, 12 Drawing Sheets

(56) References Cited

OTHER PUBLICATIONS

Office Action dated Oct. 7, 2020 for U.S. Appl. No. 16/299,322, 21 pages.
V. Charoensiri et al, "On-the-fly Conversion from Signed-Digit Number System into Complement Representation," 2006 International Symposium on Communications and Information Technologies, Bangkok, Oct. 2006, pp. 1056-1061, doi: 10.1109/ISCIT.2006.339939. (Year: 2006).
M. E. Louie et al, "On digit-recurrence division implementations for field programmable gate arrays," Proceedings of IEEE 11th Symposium Jun. 29-Jul. 2, 1993, pp. 202-209, doi: 10.11 09/ARITH.1993.378091 (Year: 1993).
Office Action dated Feb. 18, 2021, issued in U.S. Appl. No. 16/299,322 filed Mar. 12, 2019 (17 pages).
Ercegovac and Lang, "On-the-Fly Conversion of Redundant into Conventional Representations," in IEEE Transactions on Computers, vol. C-36, No. 7, pp. 895-897, Jul. 1987, doi: 10.1109/TC.1987.1676986. (Year: 1987).
Final Office Action dated Jul. 16, 2021, issued in U.S. Appl. No. 16/299,322, filed Mar. 12, 2019 (14 pages).

\* cited by examiner

Table 200:

| $q_{k+1}$ | $Q[k+1]$ | $QM[k+1]$ |
|---|---|---|
| +4 | {QM[k], 100} | {Q[k], 001} |
| +3 | {QM[k], 101} | {Q[k], 010} |
| +2 | {QM[k], 110} | {Q[k], 011} |
| +1 | {QM[k], 111} | {Q[k], 100} |
| 0 | {Q[k], 000} | {QM[k], 111} |
| −1 | {Q[k], 001} | {Q[k], 000} |
| −2 | {Q[k], 010} | {Q[k], 001} |
| −3 | {Q[k], 011} | {Q[k], 010} |
| −4 | {Q[k], 100} | {Q[k], 011} |

Table 210:

| $q_{k+1}$ | $Q[k+1]$ | $QM[k+1]$ |
|---|---|---|
| +4 | {Q[k], 100} | {Q[k], 011} |
| +3 | {Q[k], 011} | {Q[k], 010} |
| +2 | {Q[k], 010} | {Q[k], 001} |
| +1 | {Q[k], 001} | {Q[k], 000} |
| 0 | {Q[k], 000} | {QM[k], 111} |
| −1 | {QM[k], 111} | {QM[k], 110} |
| −2 | {QM[k], 110} | {QM[k], 101} |
| −3 | {QM[k], 101} | {QM[k], 100} |
| −4 | {QM[k], 100} | {QM[k], 011} |

FIG. 2

| $q_{k+1}$ | increment is +1 | | increment is +2 | | increment is +4 | |
|---|---|---|---|---|---|---|
| | $Q[k+1]$ | $QM[k+1]$ | $Q[k+1]$ | $QM[k+1]$ | $Q[k+1]$ | $QM[k+1]$ |
| +4 | {Q[k], 101} | {QM[k], 100} | {Q[k], 11} | {Q[k], 10} | {Q[k]$_{inc}$, 0} | {QM[k]$_{inc}$, 1} |
| +3 | {QM[k], 110} | {QM[k], 101} | {Q[k], 10} | {QM[k], 10} | {Q[k], 1} | {Q[k], 1} |
| +2 | {QM[k], 111} | {QM[k], 110} | {Q[k], 01} | {Q[k], 01} | {Q[k], 1} | {Q[k], 1} |
| +1 | {Q[k], 011} | {Q[k], 010} | {Q[k], 10} | {Q[k], 01} | {Q[k], 1} | {Q[k], 1} |
| 0  | {Q[k], 001} | {Q[k], 000} | {Q[k], 01} | {Q[k], 00} | {Q[k], 1} | {Q[k], 0} |
| −1 | {Q[k], 000} | {QM[k], 111} | {Q[k], 00} | {Q[k], 00} | {Q[k], 0} | {Q[k], 0} |
| −2 | {QM[k], 111} | {QM[k], 110} | {Q[k], 00} | {QM[k], 11} | {Q[k], 0} | {Q[k], 0} |
| −3 | {QM[k], 110} | {QM[k], 101} | {QM[k], 11} | {QM[k], 11} | {Q[k], 0} | {Q[k], 0} |
| −4 | {QM[k], 101} | {QM[k], 100} | {Q[k], 01} | {QM[k], 10} | {Q[k], 0} | {QM[k], 1} |

FIG. 8A

| $q_{k+1}$ | increment is +1 | | increment is +2 | | increment is +4 | |
|---|---|---|---|---|---|---|
| | $Q[k+1]$ | $QM[k+1]$ | $Q[k+1]$ | $QM[k+1]$ | $Q[k+1]$ | $QM[k+1]$ |
| +4 | {QM[k], 101} | {QM[k], 100} | {QM[k], 11} | {QM[k], 10} | {Q[k], 0} | {QM[k], 1} |
| +3 | {QM[k], 110} | {QM[k], 101} | {QM[k], 11} | {QM[k], 11} | {Q[k], 0} | {Q[k], 0} |
| +2 | {QM[k], 111} | {QM[k], 110} | {Q[k], 01} | {Q[k], 01} | {Q[k], 0} | {Q[k], 0} |
| +1 | {Q[k], 000} | {QM[k], 111} | {Q[k], 00} | {Q[k], 00} | {Q[k], 0} | {Q[k], 0} |
| 0  | {Q[k], 001} | {Q[k], 000} | {Q[k], 01} | {Q[k], 00} | {Q[k], 1} | {Q[k], 0} |
| −1 | {Q[k], 010} | {Q[k], 001} | {Q[k], 01} | {Q[k], 01} | {Q[k], 1} | {Q[k], 1} |
| −2 | {Q[k], 011} | {Q[k], 010} | {Q[k], 10} | {Q[k], 01} | {Q[k], 1} | {Q[k], 1} |
| −3 | {Q[k], 100} | {Q[k], 011} | {Q[k], 10} | {Q[k], 10} | {Q[k], 1} | {Q[k], 1} |
| −4 | {Q[k], 101} | {Q[k], 100} | {Q[k], 11} | {QM[k], 10} | {Q[k]$_{inc}$, 0} | {QM[k]$_{inc}$, 1} |

FIG. 8B

APPARATUS AND METHOD FOR ROUNDING

This application is a continuation-in-part of the U.S. application Ser. No. 16/299,322 filed 12 Mar. 2019, the entire content of which is hereby incorporated by reference.

TECHNICAL FIELD

The present disclosure relates to data processing. For instance, the present techniques could be used in relation to performing rounding.

DESCRIPTION

Rounding is a process in which a number is replaced by a shorter (approximately equal) variant. Typically this process is used to handle the situation in which the result of an operation cannot be stored in memory in a data processing apparatus due to its length, and must therefore be replaced by a simpler, shorter (approximately equal) value. Rounding might take place, for instance, on a quotient, with a remainder being used to determine the direction in which the rounding should occur. It is desirable that such rounding circuitry be computationally efficient.

SUMMARY

Viewed from a first example configuration, there is provided a data processing apparatus to convert a plurality of signed digits to an output value, the data processing apparatus comprising: receiver circuitry to receive, at each of a plurality of iterations, one of the plurality of signed digits, each of the signed digits comprising a number of bits dependent on a radix, wherein the signed digits are used to form an unrounded output value followed by zero or more extra bits; and adjustment circuitry to adjust a least-significant digit of the unrounded output value to produce an incremented unrounded output value after the plurality of iterations; and rounding circuitry to select from among the unrounded output value and the incremented unrounded output value to produce the output value, wherein the adjustment circuitry is adapted, when a value of a position of a least-significant bit of the unrounded output value is greater than or equal to the radix divided by two, to adjust a subset of the digits of the unrounded output value.

Viewed from a second example configuration, there is provided a data processing method to convert a plurality of signed digits to an output value, the method comprising: receiving, at each of a plurality of iterations, one of the plurality of signed digits, each of the signed digits comprising a number of bits dependent on a radix, wherein the signed digits are used to form an unrounded output value followed by zero or more extra bits; adjusting a least-significant digit of the unrounded output value to produce an incremented unrounded output value after the plurality of iterations; and selecting from among the unrounded output value and the incremented unrounded output value to produce the output value, wherein when a value of a position of a least-significant bit of the unrounded output value is greater than or equal to the radix divided by two, a subset of the digits of the unrounded output value are adjusted.

Viewed from a third example configuration, there is provided a data processing apparatus to convert a plurality of signed digits to an output value, the data processing apparatus comprising: means for receiving, at each of a plurality of iterations, one of the plurality of signed digits, each of the signed digits comprising a number of bits dependent on a radix, wherein the signed digits are used to form an unrounded output value followed by zero or more extra bits; means for adjusting a least-significant digit of the unrounded output value to produce an incremented unrounded output value after the plurality of iterations; and means for selecting from among the unrounded output value and the incremented unrounded output value to produce the output value, wherein when a value of a position of a least-significant bit of the unrounded output value is greater than or equal to the radix divided by two, a subset of the digits of the unrounded output value are adjusted.

BRIEF DESCRIPTION OF THE DRAWINGS

The present invention will be described further, by way of example only, with reference to embodiments thereof as illustrated in the accompanying drawings, in which:

FIG. 2 illustrates a pair of tables that show, for particular digit values, how the intermediate data (made up from a first value and a second value) is updated, depending on whether the overall number being output is positive or negative;

FIGS. 8A and 8B illustrate a pair of tables that illustrate how to perform rounding by adjusting a small number of digits in accordance with some embodiments;

DESCRIPTION OF EXAMPLE EMBODIMENTS

Figure 1:
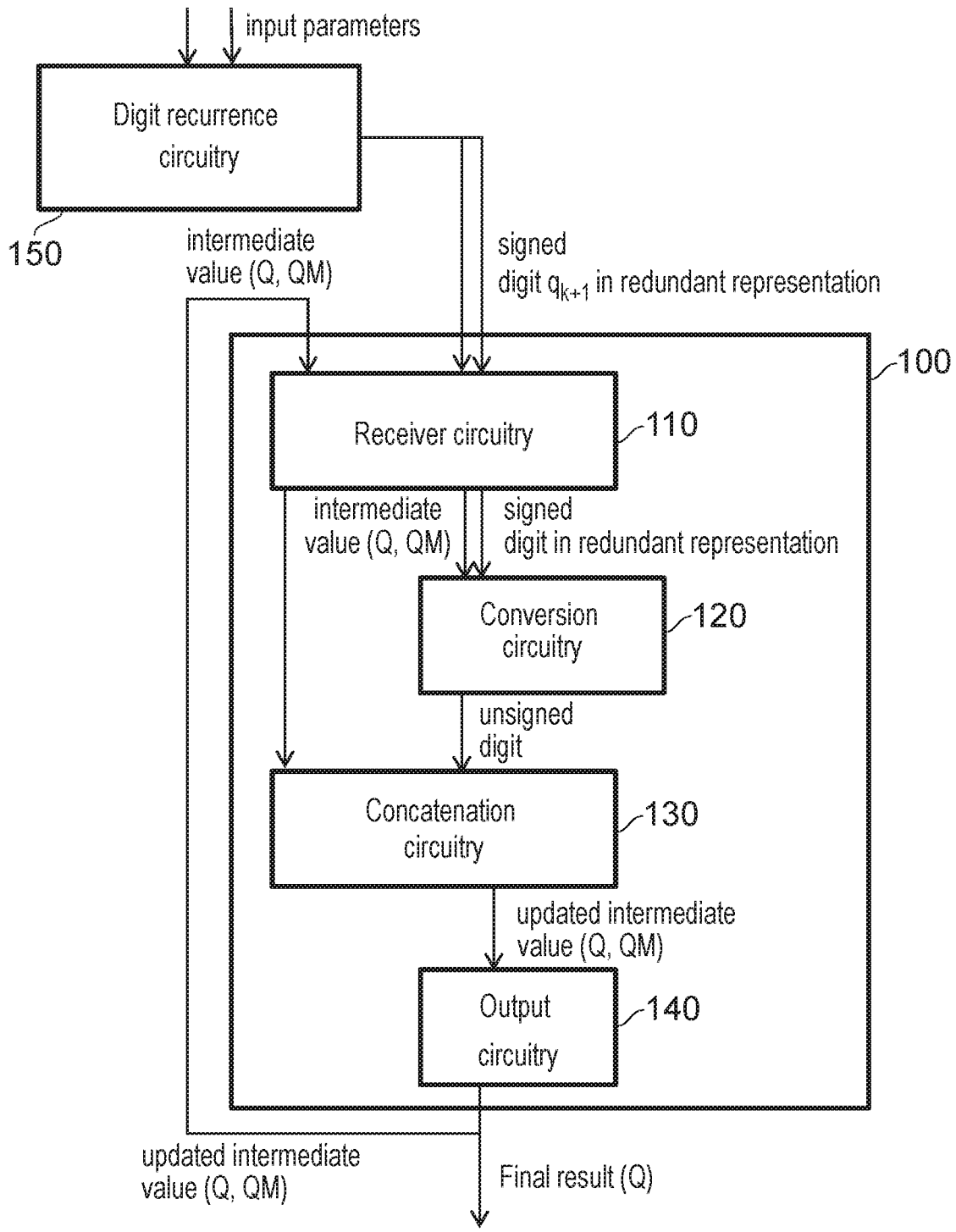
FIG. 1 schematically illustrates an apparatus in accordance with some embodiments.

Before discussing the embodiments with reference to the accompanying figures, the following description of embodiments is provided.

In accordance with some example configurations, there is provided a data processing apparatus to convert a plurality of signed digits to an output value, the data processing apparatus comprising: receiver circuitry to receive, at each of a plurality of iterations, one of the plurality of signed digits, each of the signed digits comprising a number of bits dependent on a radix, wherein the signed digits are used to form an unrounded output value followed by zero or more extra bits; and adjustment circuitry to adjust a least-significant digit of the unrounded output value to produce an incremented unrounded output value after the plurality of iterations; and rounding circuitry to select from among the unrounded output value and the incremented unrounded output value to produce the output value, wherein the adjustment circuitry is adapted, when a value of a position of a least-significant bit of the unrounded output value is greater than or equal to the radix divided by two, to adjust a subset of the digits of the unrounded output value.

In the above configurations, the receiver circuitry receives the plurality of digits over a number of iterations—with at least one digit being received each iteration. The digits are signed such that they may be positive or negative and the digits have a radix (e.g. 8), which affects how many different values can be represented by each digit. The signed digits are used to create an unrounded output value along with zero or more extra bits. The number of extra bits may be dependent on the degree of precision required and the nature of the circuitry generating the digits (specifically the number of digits produced by that circuitry at each iteration) as well as the radix. Adjustment circuitry is then used to adjust a least-significant digit of the unrounded output value (note that this digit might only be partly contained within the unrounded output value and might therefore comprise some of the extra bits). Rounding circuitry then selects which value to output as the output value. The choices for output include the unrounded output value and the incremented unrounded output value. When a value of a position of a least-significant bit of the unrounded output value is less than or equal to the radix divided by two, a subset of the digits are adjusted in order to perform the rounding. For instance, if there are 6 digits of radix four and the value of the position of the least-significant bit is four, then only two of the digits may be adjusted in order to perform the rounding. The "value" of the position of the least-significant bit is influenced by the number of extra bits that are produced. For instance, in a situation where the least-significant bit is followed by one extra bit, then the value of the position of the extra bit is 1 ($2^0$) and then the value of the position of the least-significant bit is 2 ($2^1$). As a consequence of a subset of the digits being adjusted, it is not necessary for full addition circuitry to be provided in order to increment the unrounded output value and thereby performing rounding. This reduces the complexity of the circuitry, which in turn reduces its size and power consumption. In addition, since only a small number of the digits are adjusted, the process of rounding may be sped up. In some examples, the subset is greater than one.

In some examples, the subset comprises at most two of the digits of the unrounded output value. Hence, in certain circumstances, such as those described above, only one or two of the digits of the unrounded output value will be adjusted. As above, since only a small number of digits are affected (regardless of the number of digits), it is possible to forgo more complex addition circuitry, as well as to perform rounding more quickly than might otherwise be possible.

In some examples, the two digits of the unrounded output value comprise the least-significant digit of the unrounded output value and a second-least-significant digit of the unrounded output value. As above, the least-significant digit might comprise some of the extra bits, but is at least partly contained within the unrounded output value.

In some examples, the adjustment circuitry is adapted, when the value of the position of the least-significant bit is less than the radix divided by two, to adjust at most the least-significant digit of the unrounded output value. For instance, if the radix is 8 and if there is one bit then the least-significant digit of the output value will be made up from the two least-significant bits of the output value, plus the extra bit. In this case, the value of the position of the least-significant bit of the output value is $2^1$=2. This is less than the radix (8) divided by 2, (i.e. 4). Therefore, in these embodiments, the least-significant digit of the unrounded output value is adjusted and other digits that make up the unrounded output value are not adjusted.

In some examples, the adjustment circuitry is adapted, when a value of a position of a least-significant bit of the unrounded output value is greater than or equal to the radix divided by two and the least-significant bit of the unrounded output value is '1', to adjust the subset of the digits of the unrounded output value, and otherwise to adjust the least-significant digit of the unrounded output value. In such examples, a further requirement is added to the situation in which a subset of the digits are adjusted rather than adjusting a single digit. In particular, the requirement is added that the least-significant bit of the unrounded value is '1'. For instance, in a situation where the radix is 8 and there are two extra bits, the position of the least-significant bit has a value of 4 (i.e. $2^2$). However, if the bit in that position is '0' then rounding is achieved by adjusting the lest-significant digit rather than the entire subset of digits.

In some examples, the signed digits are in redundant representation. Redundant representation is where a number is represented by a pair of words rather than a single word, as is typically the case in non-redundant representation. For instance, the number '3' could be redundantly-represented as the words (0, 3). The set of digits that are available for each word depend on the radix (r). Such representation allows certain circuits (such as Carry Save Adders) to operate more efficiently. However, some circuits cannot or do not use such representation and so conversion between the two forms can be necessary.

In some examples, the least-significant digit of the unrounded output value comprises the least-significant bit of the unrounded output value and the zero or more extra bits. In this way, the least-significant digit might overlap part of the unrounded output value as well as the extra bits.

In some examples, the data processing apparatus comprises conversion circuitry to perform a negative-output conversion from the one of the signed digits to one of a plurality of unsigned digits, such that the unsigned digits are used to form the unrounded output value followed by zero or more extra bits; concatenation circuitry to concatenate bits of the one of the unsigned digits and bits of previous intermediate data to produce updated intermediate data; and output circuitry to provide the updated intermediate data as the previous intermediate data of a next iteration and to provide the updated intermediate data as the unrounded output value after the plurality of iterations, wherein the receiver circuitry is adapted to also receive, at each of the plurality of iterations, the previous intermediate data. The conversion circuitry performs a negative-output conversion on the signed digits, i.e. a conversion where the output number is negative. The apparatus therefore performs an "on the fly" negative-output conversion. Conversion circuitry takes each signed digit as it is received and produces an unsigned digit. The conversion performed on the signed digit depends on a value of the signed digit. Having performed the conversion, the unsigned digit is concatenated to the current intermediate data to create updated intermediate data. This updated intermediate data is then provided back to the data processing apparatus for the next iteration. The rounding circuitry can then be used to round the result. After the plurality of iterations, the updated intermediate data becomes the unrounded output value, which is then adjusted as previously described.

In some examples, the receiver circuitry is adapted to also receive an indication of whether the unrounded output value is to be negative; the conversion circuitry is adapted to perform a positive-output conversion from the one of the signed digits to the one of the unsigned digits, such that the unrounded output value is positive; and the conversion circuitry is adapted to select between the negative-output conversion and the positive-output conversion in dependence on the indication. In many digit recurrence circuits, the digit recurrence process is performed using positive numbers with an inversion to a negative number performed later. For instance, in integer division, if one of the operands is negative and the other is positive, then it is known that the output will also be negative. However, the division operation will treat both numbers as being positive (e.g. the operation is done with the absolute value of the input operands) and then invert the result at the end. In these embodiments, the data processing apparatus can therefore be switched between generating positive outputs or negative outputs based on the indication. Of course, with floating point division, the mantissas are positive because the sign that indicates whether the number is positive or negative is processed separately.

In some examples, the data processing apparatus comprises: selection circuitry to speculatively generate, based on the indication, prior to the one of the signed digits being received, a set of candidate unsigned digits for each possible value of the signed digit, and to select the unsigned digit from the set of candidate unsigned digits once the signed digit is received; and the selection circuitry is adapted to select the one of the unsigned digits that corresponds with the one of the signed digits from the candidate unsigned digits. By speculatively generating a set of candidate unsigned digits before the signed digit is received, some of the conversion process can be completed ahead of time. In other words, part of the conversion process (e.g. the part that depends on the indication of whether the output is to be negative) can be carried out while the apparatus is waiting for the signed digit to be provided. This therefore removes part of the conversion process from the critical path and increases the efficiency of the data processing apparatus. The final step of conversion is merely a selection between the candidates, which occurs once the signed digit is received and which can be done quickly.

In some examples, the intermediate data comprises a first value and a second value; the conversion circuitry is adapted to perform a further negative-output conversion from the one of the signed digits to a further unsigned digit, and to perform a further positive-output conversion from the one of the signed digits to the further unsigned digit; the conversion circuitry is adapted to select between the further negative-output conversion and the further positive-output conversion in dependence on the indication; and the updated intermediate data comprises an updated first value and an updated second value. In such embodiments, either the positive-output and further positive-output conversions are performed, or the negative-output and further negative-output conversions are performed, depending on the indication. The intermediate data is made up from a pair of values (the first value and the second value) and two conversions may be performed, as previously explained, in order to produce an updated first value and an updated second value. Note that the term "update" does not imply that there must be commonality between the first value and the updated first value and also between the second value and the updated second value. In some embodiments, there is commonality either between the first value and updated first value or between the second value and updated second value. The final result may be made up of either the updated first value, the updated second value, or both values.

In some examples, the adjustment circuitry is adapted to adjust a least significant digit of each of the first value and the second value to produce the incremented unrounded output value comprising an incremented first value and an incremented second value; and the rounding circuitry is adapted to select from among the first value, the incremented first value, the second value, and incremented second value. The first value and the second value could correspond with, for instance, a quotient and a (quotient−1).

In some examples, the concatenation circuitry is adapted: if the one of the signed digits is zero and the indication indicates that the output value is to be negative, to produce the updated first value by concatenating the first value with the one of the unsigned digits and to produce the updated second value by concatenating the second value with the further unsigned digit, and otherwise to produce the updated first value by concatenating one of the first value and the second value with the unsigned digit and to produce the updated second value by concatenating the one of the first value and the second value with the further unsigned digit.

In some examples, the one of the first value and the second value is dependent on whether the signed digit is positive or negative and the indication.

In some examples, the conversion circuitry performs the conversion without addition circuitry. In previously proposed techniques, a positive integer can be converted to a negative integer by determining the twos complement of the positive integer and then adding 1 to the result. This process, however, requires the use of inversion circuitry and addition circuitry, which can lead to a large and slow circuit. This can therefore result in increased power consumption. Furthermore, the entire operation can only be performed once all the signed digits are received, which results in a higher latency than if the circuits are converted "on the fly". By avoiding the use of addition circuitry, these embodiments are able to save on space and power consumption and may be able to produce the negative output value in fewer processor cycles due to performing the conversion "on the fly".

In some examples, the rounding circuitry performs the rounding without addition circuitry. As above, addition can be performed by simply providing a conventional adder circuit and performing the necessary addition. In practice, this requires the addition of a large amount of circuitry. The present technique forgoes such addition circuitry and instead performs an adjustment on a small number of digits. By limiting the extent to which modification of the digits is necessitated, the process of performing the rounding can be performed using less complex circuitry, which leads to smaller circuit size and lower power consumption.

In some examples, the data processing apparatus comprises digit recurrence circuitry to perform a digit recurrence operation to produce the plurality of signed digits, wherein in each of the plurality of iterations, one of the plurality of signed digits is provided to the receiver circuitry. Conversion can therefore be performed as each digit is received, rather than having to wait for all of the digits to be received. Consequently, latency is reduced In some examples, the output value is an integer. The present apparatus may also be used when the signed digits correspond with an integer division operation.

Before describing the embodiments, a brief summary of floating point numbers and their use in data processing devices is provided.

Floating-point (FP) is a useful way of approximating real numbers using a small number of bits. The IEEE 754-2008 FP standard proposes multiple different formats for FP numbers, but three of these are binary 64 (also known as double precision, or DP), binary 32 (also known as single precision, or SP), and binary 16 (also known as half precision, or HP). The numbers 64, 32, and 16 refer to the number of bits required for each format.

Representation

FP numbers are quite similar to the "scientific notation" taught in science classes, where instead of negative two million we'd write $-2.0 \times 10^6$. The parts of this number are the sign (in this case negative), the significand (2.0), the base of the exponent (10), and the exponent (6). All of these parts have analogs in FP numbers, although there are differences, the most important of which is that the constituent parts are stored as binary numbers, and the base of the exponent is always 2.

More precisely, FP numbers all consist of a sign bit, some number of biased exponent bits, and some number of fraction bits. In particular, the formats we are interested in consist of the following bits:

| format | sign | exponent | fraction | exponent bias |
|---|---|---|---|---|
| DP [63:0] | 63 | 62:52 (11 bits) | 51:0 (52 bits) | 1023 |
| SP [31:0] | 31 | 30:23 (8 bits) | 22:0 (23 bits) | 127 |
| HP [15:0] | 15 | 14:10 (5 bits) | 9:0 (10 bits) | 15 |

The sign is 1 for negative numbers and 0 for positive numbers. Every number, including zero, has a sign.

The exponent is biased, which means that the true exponent differs from the one stored in the number. For example, biased SP exponents are 8-bits long and range from 0 to 255. Exponents 0 and 255 are special cases, but all other exponents have bias 127, meaning that the true exponent is 127 less than the biased exponent. The smallest biased exponent is 1, which corresponds to a true exponent of −126. The maximum biased exponent is 254, which corresponds to a true exponent of 127. HP and DP exponents work the same way, with the biases indicated in the table above.

SP exponent 255 (or DP exponent 2047, or HP exponent 31) is reserved for infinities and special symbols called NaNs (not a number). Infinities (which can be positive or negative) have a zero fraction. Any number with exponent 255 and a nonzero fraction is a NaN. Infinity provides a saturation value, so it actually means something like "this computation resulted in a number that is bigger than what we can represent in this format." NaNs are returned for operations that are not mathematically defined on the real numbers, for example division by zero or taking the square root of a negative number.

Exponent zero, in any of the formats, is reserved for subnormal numbers and zeros. A normal number represents the value:

$-1^{sign} 1 \cdot \text{fraction} \times 2^e$ where e is the true exponent computed from the biased exponent. The term 1·fraction is called the significand, and the 1 is not stored as part of the FP number, but is instead inferred from the exponent. All exponents except zero and the maximum exponent indicate a significand of the form 1·fraction. The exponent zero indicates a significand of the form 0·fraction, and a true exponent that is equal to 1−bias for the given format. Such a number is called subnormal (historically these numbers were referred to as denormal, but modern usage prefers the term subnormal).

Numbers with both exponent and fraction equal to zero are zeros.

The following table has some example numbers in HP format. The entries are in binary, with '_' characters added to increase readability. Notice that the subnormal entry (4th line of the table, with zero exponent) produces a different significand than the normal entry in the preceding line.

| sign | 5-bit exponent | 10-bit fraction | 11-bit significand | value |
|---|---|---|---|---|
| 0 | 01111 | 00_0000_0000 | 100_0000_0000 | $1.0 \times 2^0$ |
| 1 | 01110 | 10_0000_0000 | 110_0000_0000 | $-1.1 \times 2^{-1}$ |
| 0 | 00001 | 10_0000_0000 | 110_0000_0000 | $1.1 \times 2^{-14}$ |
| 0 | 00000 | 10_0000_0000 | 010_0000_0000 | $0.1 \times 2^{-14}$ |
| 1 | 11111 | 00_0000_0000 |  | −infinity |
| 0 | 11111 | 00_1111_0011 |  | NaN |

A large part of the complexity of FP implementation is due to subnormals, therefore they are often handled by microcode or software. Some implementations handle subnormals in hardware, speeding up these operations by a factor of 10 to 100 compared to a software or microcode implementation.

Integers, Fixed-Point, Floating-Point

The FP way of handling signs is called sign-magnitude, and it is different from the usual way integers are stored in the computer (two's complement). In sign-magnitude representation, the positive and negative versions of the same number differ only in the sign bit. A 4-bit sign-magnitude integer, consisting of a sign bit and 3 significand bits, would represent plus and minus one as:

+1=0001

−1=1001

In two's complement representation, an n-bit integer i is represented by the low order n bits of the binary n+1-bit value $2^n+i$, so a 4-bit two's complement integer would represent plus and minus one as:

+1=0001

−1=1111

The two's complement format is practically universal for signed integers because it simplifies computer arithmetic.

A fixed-point number looks exactly like an integer, but actually represents a value that has a certain number of fractional bits. Sensor data is often in fixed-point format, and there is a great deal of fixed-point software that was written before the widespread adoption of FP. Fixed-point numbers are quite tedious to work with because a programmer has to keep track of the "binary point", i.e. the separator between the integer and fractional parts of the number, and also has to constantly shift the number to keep the bits in the correct place. FP numbers don't have this difficulty, so it is desirable to be able to convert between fixed-point numbers and FP numbers. Being able to do conversions also means that we can still use fixed-point software and data, but we are not limited to fixed-point when writing new software.

Rounding FP Numbers

Most FP operations are required by the IEEE-754 standard to be computed as if the operation were done with unbounded range and precision, and then rounded to fit into an FP number. If the computation exactly matches an FP number, then that value is always returned, but usually the computation results in a value that lies between two consecutive floating-point numbers. Rounding is the process of picking which of the two consecutive numbers should be returned.

There are a number of ways of rounding, called rounding modes; six of these are:

| mode | | definition |
| --- | --- | --- |
| RNE | round-to nearest, ties to even | pick the closest value, or if both values are equally close then pick the even value |
| RNA | round to nearest, ties to away | pick the closest value, or if both values are equally close then pick the value farthest away from zero |
| RZ | round to zero | pick the value closest to zero |
| RP | round to plus infinity | pick the value closest to plus infinity |
| RM | round to minus infinity | pick the value closest to minus infinity |
| RX | round to odd | pick the odd value |

The definition doesn't tell us how to round in any practical way. One common implementation is to do the operation, look at the truncated value (i.e. the value that fits into the FP format) as well as all of the remaining bits, and then adjust the truncated value if certain conditions hold. These computations are all based on:

L—(least) the least significant bit of the truncated value
G—(guard) the next most significant bit (i.e. the first bit not included in the truncation)
S—(sticky) the logical OR of all remaining bits that are not part of the truncation Given these three values and the truncated value, we can always compute the correctly rounded value according to the following table:

| mode | change to the truncated value |
| --- | --- |
| RNE | increment if (L&G)|(G&S) |
| RNA | increment if G |
| RZ | none |
| RP | increment if positive & (G|S) |
| RM | increment if negative & (G|S) |
| RX | set L if G|S |

For example, consider multiplying two 4-bit significands, and then rounding to a 4-bit significand.

sig1=1011(decimal 11)

sig2=0111(decimal 7)

multiplying yields sig1×sig2=1001_101 (decimal 77)

The least significant bit of the truncated 4-bit result is labeled L, the next bit G, and S is the logical OR of the remaining bits labeled s (i.e. S=0|1=1). To round, we adjust our 4-bit result (1001) according to the rounding mode and the computation in the table above. So for instance in RNA rounding, G is set so we return 1001+1=1010. For RX rounding G|S is true so we set L to 1 (it's already 1, so in this case nothing changes) and return 1001.

Rounding Integer and Fixed-Point Numbers

If we convert an FP number to integer or fixed-point we also have to round. The concept is basically the same as FP rounding. An FP number that happens to be an integer always rounds to that integer. All other FP numbers lie between two consecutive integers, and rounding dictates which integer is returned. Unfortunately the rounding logic for integers is somewhat harder because of the differences between two's complement and sign-magnitude form. Incrementing a sign-magnitude number alway increases the magnitude, so the incremented number is farther away from zero. The same thing happens for positive two's complement numbers, but negative two's complement numbers become closer to zero when incremented. This means that the rounding logic has to change based on whether the integer is positive or negative. It also means we have to be careful in picking the base value (the value which will be incremented or not). For positive integers, that value is just the truncated FP significand, so 1.37 will have a base value of 1, and a result of either 1 or 2. For negative integers, we again truncate the significand and take the one's complement of the result (one's complement is the original number with all bits inverted), −1.37 is truncated to 1 and then inverted, giving a base value of −2. Everything then works out since we want our result to be either −2 or (when incremented) −1.

To further complicate things, our method of conversion requires some computation to find L, G, and S for negative integers. Correct rounding would require us to complete the two's complement process (invert and add 1) and then compute L, G, and S, but adding that 1 is slow compared to just inverting. Ideally we would like to compute the actual L, G, and S from the original shifted input (i.e., from the input before we've done anything about signs. So the floating-point 1.37 or −1.37 would both be right shifted to the integer 1).

Let L0, G0, and S0 be the least significant bit (lsb), guard and sticky before inverting, and let Li, Gi, and Si be lsb, guard and sticky after inverting, and finally let L, G, and S be the lsb, guard and sticky after inverting and adding 1.

If S0 is zero, then the bits contributing to Si are all ones, and hence S (obtained by adding 1 to those Si bits) is also zero. If S0 is nonzero, then Si is not all ones, and hence S is nonzero. So in all cases S0=S.

If G0 is zero, then Gi is 1, and G is also one except for the case when there is a carry-in from the S bits, which only happens when S0 is zero. If G0 is 1, then Gi is zero, and again G is also one except for the case where there is a carry-in from the S bits, which only happens when S0 is zero. So G=G0^S0.

By very similar logic, L=L0^(G0|S0).

Now that we have L, G, and S for both negative and positive integers, we can come up with our rounding rules:

| mode | change to a positive value | change to a negative value |
| --- | --- | --- |
| RNE | increment if (L&G)|(G&S) | increment if (L&G)|(G&S) |
| RNA | increment if G | increment if (G&S) |
| RZ | none | increment if (G|S) |
| RP | increment if (G|S) | increment if (G|S) |
| RM | none | none |
| RX | set L if G|S | set L if G|S |

Fixed-point numbers round exactly the same way as integers. The rules for unsigned conversions (to integer or fixed-point) are the same as the rules for positive conversions.

Injection Rounding

A faster way to do rounding is to inject a rounding constant as part of the significand addition that is part of almost every FP operation. To see how this works, consider adding numbers in dollars and cents and then rounding to dollars. If we add $$\begin{array}{r}\$1.27\\+\ \$2.35\\ \hline \$3.62\end{array}$$

We see that the sum $3.62 is closer to $4 than to $3, so either of the round-to-nearest modes should return $4. If we represented the numbers in binary, we could achieve the same result using the L, G, S method from the last section. But suppose we just add fifty cents and then truncate the result?

$$\begin{array}{rl}1.27&\\+\ 2.35&\\+\ 0.50&\text{(rounding injection)}\\ \hline 4.12&\end{array}$$

If we just returned the dollar amount ($4) from our sum ($4.12), then we have correctly rounded using RNA rounding mode. If we added $0.99 instead of $0.50, then we would correctly round using RP rounding. RNE is slightly more complicated: we add $0.50, truncate, and then look at the remaining cents. If the cents remaining are nonzero, then the truncated result is correct. If there are zero cents remaining, then we were exactly in between two dollar amounts before the injection, so we pick the even dollar amount. For binary FP this amounts to setting the least significant bit of the dollar amount to zero.

Adding three numbers is only slightly slower than adding two numbers, so we get the rounded result much more quickly by using injection rounding than if we added two significands, examined L, G, and S, and then incremented our result according to the rounding mode.

Implementing Injection Rounding

For FP, the rounding injection is one of three different values, values which depend on the rounding mode and (sometimes) the sign of the result.

Both RNA and RNE require us to inject a 1 at the G position (this is like adding $0.50 in our dollars and cents example).

RP and RM rounding depends on the sign as well as the mode. RP rounds positive results up (increases the magnitude of the significand towards positive infinity), but truncates negative results (picking the significand that is closer to positive infinity). Similarly RM rounds negative results up (increasing the magnitude of the significand toward negative infinity), but truncates positive results (picking the significand that is closer to negative infinity). Thus we split RM and RP into two cases: round up (RU) when the sign matches the rounding direction, and truncation (RZ) when the sign differs from the rounding injection. For RU cases we inject a 1 at the G-bit location and at every location that contributes logically to S (this is like adding $0.99 in our dollars and cents example).

For RZ and RX modes, and for RP and RM modes that reduce to RZ mode, we inject zeros.

For most of the rounding modes, adding the rounding injection and then truncating gives the correctly rounded result. The two exceptions are RNE and RX, which require us to examine G and S after the addition. For RNE, we set L to 0 if G and S are both zero. For RX we set L to 1 if G or S are nonzero.

FP Number are Not Real Numbers

It's tempting to think of FP numbers as being just like real numbers, but they are fundamentally different, even for the most basic properties:

They are not associative. For example, in SP we can add 3 numbers and return 1 million or zero, perhaps not what people think of as a rounding error:

$$(2^{45}+-2^{45})+2^{20}=2^{20}$$

$$2^{45}+(-2^{45}+2^{20})=0$$

They don't obey the distributive laws. Again in SP:

$$3{,}000{,}001*(4.00001+5.00001)=0\text{x4bcdfe83}$$

$$(3{,}000{,}001*4.00001)+\\(3{,}000{,}001*5.00001)=0\text{x4bcdfe82}$$

and things get even worse in the presence of overflow:

$$2^{50}*(2^{78}-2^{77})=2^{127}$$

$$(2^{50}*2^{78})-(2^{50}*2^{77})=\text{infinity}$$

In some implementations, they aren't even commutative unless we are in default NaN mode (a mode that converts all NaNs to a single NaN), because in general nanA+nanB!=nanB+nanA. Numeric adds and multiplies are commutative.

Because of IEEE NaN rules, there are no multiplicative or additive identities. One and zero work as identities for numeric values.

One useful way to think of FP numbers is to consider them to be very long fixed-point numbers in which at most a few (53 for DP) consecutive bits can be nonzero. For example, non-infinite DP numbers can have the first bit of the significand in any of 2046 places, and that first bit is followed by 52 other significant bits, and there is a sign bit, so any finite DP number can be represented as a 2046+52+1=2099-bit fixed point number. Examined this way it becomes very obvious that adding two FP numbers does not, in general, result in another FP number: the result of the addition has to be rounded so that it becomes an FP number.

Particular embodiments will now be described with reference to the figures.

FIG. 1 illustrates an apparatus in accordance with some embodiments. The apparatus includes receiver circuitry 110 that receives, in redundant-representation, a signed digit $q_{k+1}$ (where k is the number of the iteration). The signed digit $q_{k+1}$ may, for instance, be generated by digit recurrence circuitry 150 that generates a number of signed digits (e.g. one per iteration). The sequence of signed digits in this embodiment forms a positive number that is to be converted to a negative number "on-the-fly". The receiver circuitry 110 also receives intermediate data, which in this embodiment is a pair of words (Q, QM), referred to in the claims as a first value and a second value. These values represent a partial result (Q), and a partial result minus one (QM). The intermediate data may be used as a "working value" for the plurality of iterations for which the data processing apparatus 100 operates. Once the required number of iterations has been performed, the intermediate data (or part thereof) is output as the final result, which corresponds with the sequence of digits received from the digit recurrence circuitry in redundant representation as a negative value in non-redundant-representation. In this case, the word Q is output as the final result.

The conversion circuitry 120 performs a conversion from the signed digit $q_{k+1}$ in redundant-representation to an unsigned digit in non-redundant-representation. The conversion is dependant on the value of the signed digit $q_{k+1}$ and the radix r, which for the purposes of this embodiment is 8. In particular, the signed digit can be constrained to a number of different digits depending on a radix r in which the digit-recurrence circuitry operates. For the purpose of these examples, it would be assumed that the radix r is 8. However the present technique is not limited to this and the below text illustrates how the present technique may be adapted for use with other values of the radix. The unsigned digit generated by the conversion circuitry 120 is passed to the concatenation circuitry 130, which also receives the intermediate data (Q, QM) from the receiver circuitry 110. The concatenation circuitry 130 then performs a concatenation between one of the words (Q or QM) in the intermediate data (Q, QM) and the unsigned digit received from the conversion circuitry 120. This results in an updated intermediate data being produced. The updated value is then passed through to the output circuitry 140, which outputs the updated intermediate data back to the receiver circuitry 110 for a further iteration of the data processing apparatus 100 on a further signed digit received from the digit recurrence circuitry 150. After a certain number of iterations have been performed (e.g. once a desired accuracy level has been produced), the updated intermediate data is provided as the final value.

FIG. 2 illustrates a pair of tables 200, 210, which illustrate the conversion performed by the conversion circuitry 120 and the concatenation performed by the concatenation circuitry 130. In this embodiment, the intermediate data is made up of a pair of values Q and QM, and two unsigned digits are generated with two concatenations being performed—one for Q and one for QM.

Where the overall result is positive, the partial result after iteration k−1 of digit recurrence circuitry 150 is given by the equation:

$$Q[k] = \Sigma_{j=1}^{k} q_i \times r^{-1} \quad (1)$$

Where $q_i$ is the digit output by the digit recurrence circuitry 150 at iteration i. Therefore, after iteration k−1, the partial result is given by the equation:

$$Q[k+1] = Q[k] + q_{k+1} \times r^{-(k+1)}$$

Since $q_{k+1}$ can be negative, the following algorithm can be used for the addition:

$$Q[k+1] = \begin{cases} Q[k] + q_{k+1} \times r^{-(k+1)} & \text{if } q_{k+1} \geq 0 \\ Q[k] - r^{-k} + (r - |q_{k+1}|) \times r^{-(k+1)} & \text{if } q_{k+1} < 0 \end{cases}$$

Defining:

$$QM[k] = Q[k] - r^{-k}$$

the following equations are obtained:

$$Q[k+1] = \begin{cases} Q[k] + q_{k+1} \times r^{-(k+1)} & \text{if } q_{k+1} \geq 0 \\ QM[k] + (r - |q_{k+1}|) \times r^{-(k+1)} & \text{if } q_{k+1} < 0 \end{cases}$$

$$QM[k+1] = \begin{cases} Q[k] + (q_{k+1} - 1) \times r^{-(k+1)} & \text{if } q_{k+1} > 0 \\ QM[k] + ((r-1) - |q_{k+1}|) \times r^{-(k+1)} & \text{if } q_{k+1} \leq 0 \end{cases}$$

The updating rules for Q and QM (when the overall result is positive) are therefore given by the equations:

$$Q[k+1] = \begin{cases} \{Q[k], q_{k+1}\} & \text{if } q_{k+1} \geq 0 \\ \{QM[k], (r - |q_{k+1}|)\} & \text{if } q_{k+1} < 0 \end{cases}$$

$$QM[k+1] = \begin{cases} \{Q[k], q_{k+1} - 1\} & \text{if } q_{k+1} > 0 \\ \{QM[k], (r-1) - |q_{k+1}|\} & \text{if } q_{k+1} \leq 0 \end{cases}$$

Where the notation {x, y} means to concatenate x and y. Note that this is not an arithmetic operation. If the overall result is to be negative, then the sign of the digits in Equation (1) are changed. This is achieved by swapping Q[k] and QM[k] before the concatenation of the new digit (if the new digit is not 0), and by changing the sign of the digit $q_{k+1}$ before concatenating it to the partial result.

The updating rules for Q and QM (when the overall result is negative) are therefore given by the equations:

$$Q[k+1] = \begin{cases} \{QM[k], (r - q_{k+1})\} & \text{if } q_{k+1} > 0 \\ \{Q[k], 0\} & \text{if } q_{k+1} = 0 \\ \{Q[k], |q_{k+1}|\} & \text{if } q_{k+1} < 0 \end{cases}$$

$$QM[k+1] = \begin{cases} \{QM[k], (r - q_{k+1}) - 1\} & \text{if } q_{k+1} > 0 \\ \{QM[k], -1\} & \text{if } q_{k+1} = 0 \\ \{Q[k], |q_{k+1}| - 1\} & \text{if } q_{k+1} < 0 \end{cases}$$

In this embodiment, a radix value (r) of 8 is used. In redundant representation, this gives rise to nine possible digits: +4, +3, +2, +1, 0, −1, −2, −3, −4. Each digit is represented by three bits. For instance, the value +4 would be represented by the bits/words (100, 000) and the value −4 would be represented by the bits/words (000, 100). The unsigned digit that is generated by the conversion circuitry 120 is dependant on a value of the received signed digit $q_{k+1}$.

The first table 200 illustrates, for a radix (r) of 8 where the overall result is to be made negative (e.g. for a negative-output conversion), for each possible value of the signed digit $q_{k+1}$, the unsigned digit that is generated and the concatenation that is performed. The generated digits and the concatenations are generated based on the above formulae.

For example, if the signed digit $q_{k+1}$ is +3, then the updated value of Q is derived by taking the value QM and concatenating the bits "101". The updated value of QM is produced by taking the original value of QM and concatenating the bits "100". Similarly, if the signed digit $q_{k+1}$ is −1, then the value of Q is generated by taking the original value of Q and concatenating the bits "001". The updated value of QM is produced by taking the current value of Q and appending the bits "000".

If the conversion to a negative number is not to be performed, i.e. if the overall result is to remain positive, then the conversions and concatenations illustrated in table 210 are performed in order to provide a positive-output conversion. For instance, if the signed digit $q_{k+1}$ is 0, then the updated value of Q is provided by taking the input value of Q and concatenating the bits "000". Then, the updated value of QM is produced by taking the input value of QM and concatenating the bits "111". Similarly, if the signed digit is −4, then the updated value of Q is generated by taking the value of QM and appending the bits "100" while the updated value of QM is generated by taking the existing value of QM and appending the bits "011".

This process can then be repeated for the next signed digit that is received, $q_{k+2}$ from the digit recurrence circuitry 150. For example, if the sequence of digits output from the digit recurrence circuitry (across a plurality of iterations) is: 1, −2, −4, 2, 0, −1, and if the overall result was to be negative then the values of Q and QM that are generated at each iteration (k) (using the table 200) would be as follows:

| k | $q_k$ | Q[k] | QM[k] |
|---|---|---|---|
| 0 | — | — | — |
| 1 | 1 | 111 | 110 |
| 2 | −2 | 111 010 | 111 001 |
| 3 | −4 | 111 010 100 | 111 010 011 |
| 4 | 2 | 111 010 011 110 | 111 010 011 101 |
| 5 | 0 | 111 010 011 110 000 | 111 010 011 101 111 |
| 6 | −1 | 111 010 011 110 000 001 | 111 010 011 110 000 000 |

The end result is then output as Q[6], i.e. 111 010 011 110 000 001 (assuming that six iterations take place).

Similarly, if the overall result was to be positive, then the values of Q and QM that are generated at each iteration (k) (using the table 210) would be as follows:

| k | $q_k$ | Q[k] | QM[k] |
|---|---|---|---|
| 0 | — | — | — |
| 1 | 1 | 001 | 000 |
| 2 | −2 | 000 110 | 000 101 |
| 3 | −4 | 000 101 100 | 000 101 011 |
| 4 | 2 | 000 101 100 010 | 000 101 100 001 |
| 5 | 0 | 000 101 100 010 000 | 000 101 100 001 111 |
| 6 | −1 | 000 101 100 001 111 111 | 000 101 100 001 111 110 |

The end result is then output as Q[6], i.e. 000 101 100 001 111 111 (assuming that six iterations take place).

Figure 3:
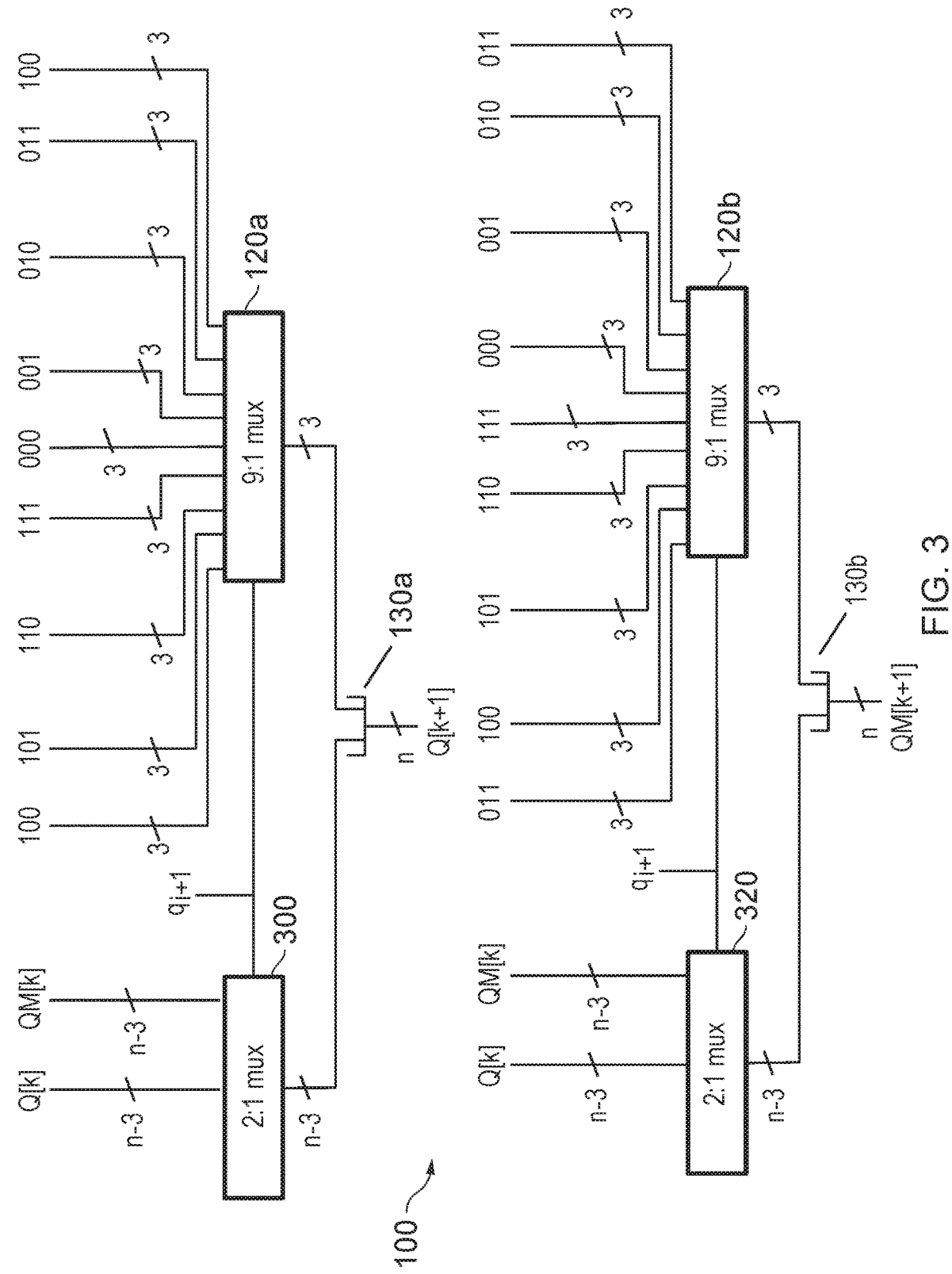
FIG. 3 illustrates an apparatus in accordance with some embodiments.

FIG. 3 illustrates, in the form of a circuit, an example of the data processing apparatus 100 that is capable of performing an on-the-fly conversion to a negative number. The selection circuitry 120 is made up from a pair of multiplexers 120a, 120b. Meanwhile, the concatenation circuitry 130 is made up from a pair of concatenation circuits 130a, 130b. In this way, one of the two conversion circuits 120a, and one of the concatenation circuits 130a are directed towards producing the updated value Q. Meanwhile, the second multiplexer 120b and the second concatenation circuitry 130b are directed towards producing the updated value QM. Note that (except where the signed digit $q_{k+1}$ is 0), when the intermediate data is updated from (Q[k], QM[k]) to (Q[k+1], QM[k+1]), both Q[k+1] and QM[k+1] are changed based on either Q[k] or QM[k].

Accordingly, multiplexers 300, 320 are provided in order to select between Q and QM as the input to update both Q and QM in dependence on the value of the new signed digit $q_{k+1}$.

Figure 4:
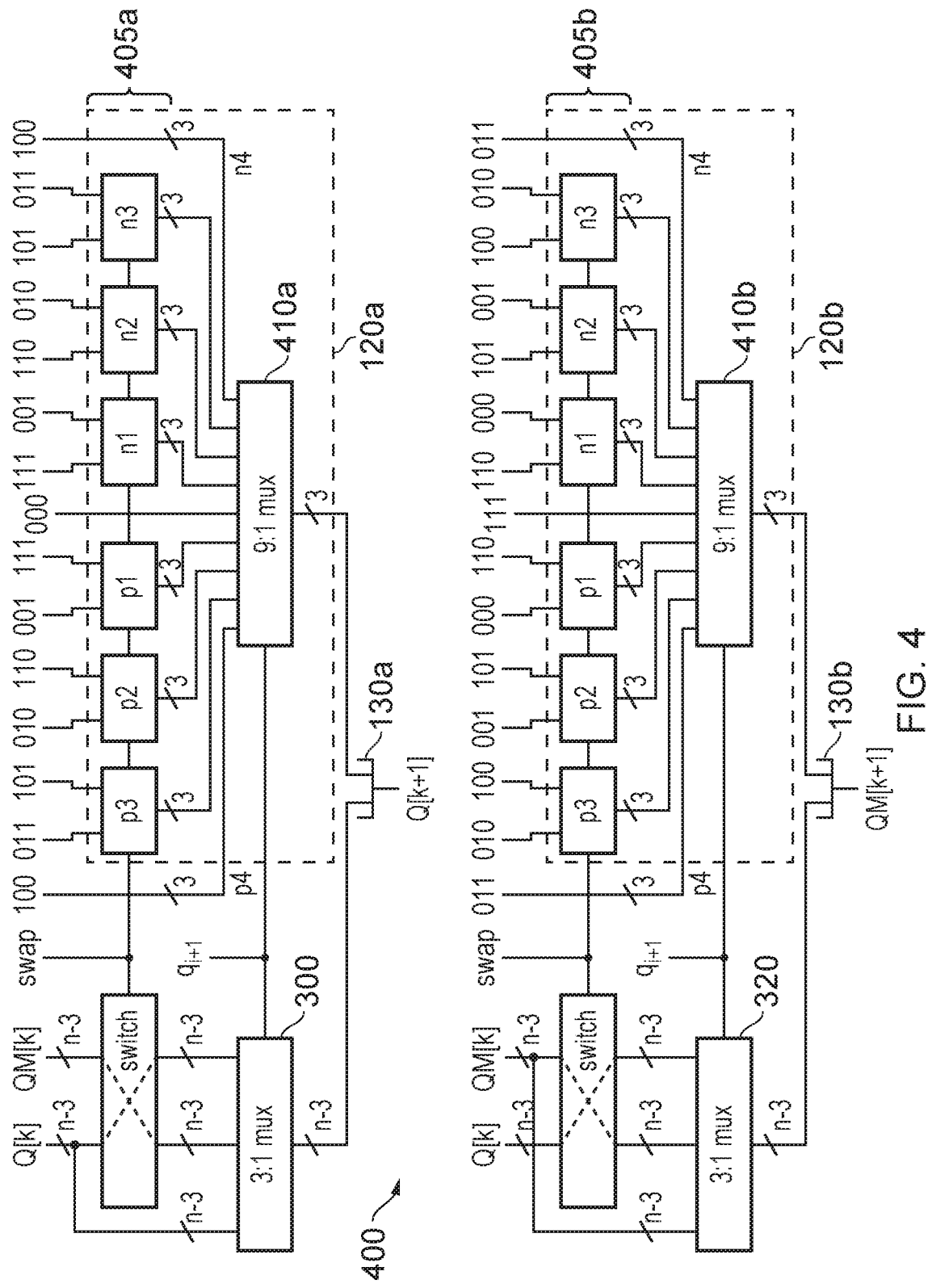
FIG. 4 illustrates an apparatus that speculatively generates candidate values to be concatenated with intermediate data, in accordance with some embodiments.

FIG. 4 illustrates a variant of the data processing apparatus 100. This data processing apparatus 400 is able to convert the signed digit $q_{k+1}$ to an unsigned digit. The conversion is selective in the sense that the conversion can be performed so that the final output (in non-redundant-representation) will be a positive number or a negative number. In this embodiment, the input signal "swap" is provided to indicate whether the final output should be negative or not. This signal therefore chooses between the values of the table 200 for negative conversion and the values of the table 210 for positive conversion. In addition, the signal is used to 'swap' the inputs Q and QM around so that the concatenation is performed on the correct one of Q or QM, depending on whether the output number is to be negative or not, and in dependence on the sign of the signed digit $q_{k+1}$.

One further feature of the embodiment illustrated in FIG. 4 is that part of the conversion process is performed speculatively. That is, before the signed digit is received, a number of candidate unsigned digits are generated in dependence on whether a negative conversion is being performed or not. This speculative generation is collectively performed by sets of multiplexers 405a, 405b. The sets of multiplexers 405a, 405b use the 'swap' signal as a selection signal. In this way, the 'swap' signal chooses either the negative values or the positive values from the tables 200, 210. The candidates are then passed to 9:1 multiplexers 410a, 410b. The candidates received by the 9:1 multiplexers 410a, 410b are therefore the unsigned digits for each possible value of the signed digit $q_{k+1}$ that has yet to be received, and the candidates are either for positive or negative conversion, as selected by the 'swap' signal. Having generated the candidate unsigned digits, a selection between the candidates is made once the signed digit $q_{k+1}$ is finally received. This speculative generation makes it possible to perform part of the conversion process in advance before the signed digit $q_{k+1}$ is received, which removes part of the conversion process from the critical path. In particular, the only process that occurs once the signed digit is received is a selection $q_{k+1}$—no further generation needs to take place and it is not necessary to wait for such generation to take place once the signed digit $q_{k+1}$ is received.

Figure 5:
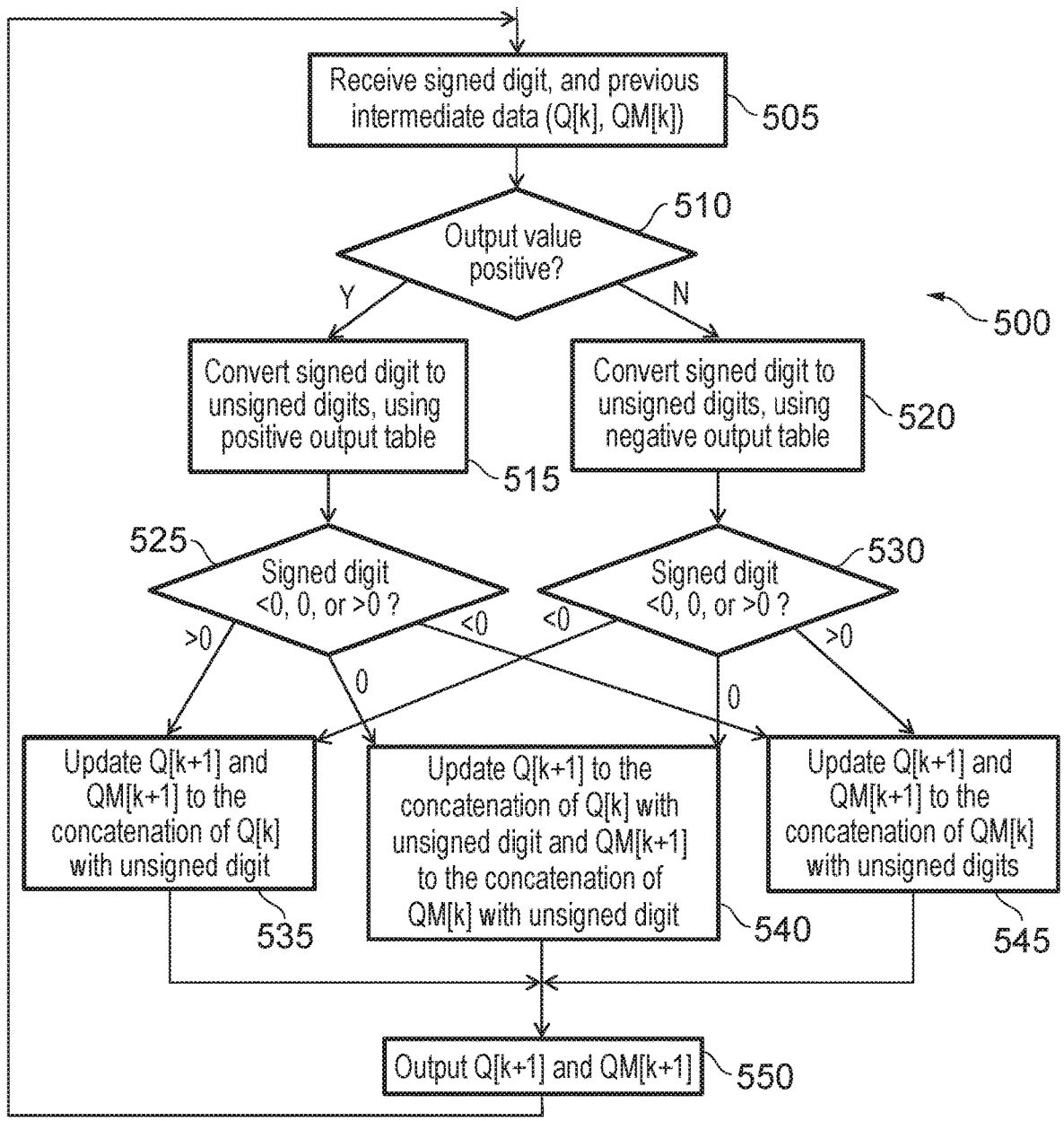
FIG. 5 shows a flowchart that illustrates a method of data processing in accordance with some embodiments.

FIG. 5 illustrates a flow chart 500 that shows a method of data processing in accordance with some embodiments. At step 505, the signed digit is received together with the previous intermediate data Q[k], QM[k]. Note that as previously described with reference to FIG. 4, the receiving of the signed digit $q_{k+1}$ could be delayed. At step 510, it is checked whether the output value (e.g. the final result) is to be positive or negative. If the output value is to be positive, then the signed digit is converted to unsigned digits based on the positive output table 210. Otherwise, at step 520, the signed digit is converted to an unsigned digits based on the negative output table 200. The process then proceeds to either of steps 525 or 530 each of which determines whether the signed digit is less than 0, 0, or greater than 0.

In the case of step 525, if the signed digit $q_{k+1}$ is less than 0, then at step 535, Q[k+1] is generated by concatenating Q[k] with one of the signed digits, and QM[k+1] is generated by concatenating Q[k] with the other of the signed digits.

If, at step 525, the signed digit $q_{k+1}$ is 0, then at step 540, Q[k+1] is provided by concatenation of Q[k] with one of the unsigned digits and QM[k+1] is provided by the concatenation of QM[k] with the other generated unsigned digit.

If, at step 525, the signed digit $q_{k+1}$ is greater than 0, then at step 545, the value of Q[k+1] is generated by concatenating QM[k] with one of the signed digits, and QM[k+1] is generated by concatenating QM[k] with the other of the signed digits.

At step 530, the path taken is inverted. In particular, if the signed digit $q_{k+1}$ at 530 is less than 0, then the process proceeds to the previously explained step 535. If the signed digit $q_{k+1}$ is 0, then the process proceeds to the previously described step 540. And if the signed digit $q_{k+1}$ is greater than 0, then the process proceeds to the previously described step 545.

In any event, having updated Q and QM at any of steps 535, 540, 545, the process proceeds to step 550 where Q[k+1] and QM[k+1] are output. In due course, if the required number of iterations have been performed, then Q[k+1] is output as the final result.

The above embodiments therefore demonstrate how on-the-fly conversion of signed digits to unsigned digits can be performed where the output number made up from the unsigned digits is overall to be negative (or selectively negative and positive). This approach negates the use for addition circuitry, which can consumes additional circuit space and power, and since the conversion takes place on-the-fly, e.g. as each digit is received, the latency is kept low as compared to a situation where all the digits are converted only after they are all received. The embodiments described above therefore preserve space and power consumption and can operate with low latency.

As a further step, the on-the-fly converted signed digits can be rounded. The following description provides a technique that can be used to perform rounding with values generated with digit-recurrence circuitry, for example, and is usable with the previously described technique of on-the-fly conversion.

Typically, the process of rounding a value involves the selection of one of two adjacent numbers, with the value lying somewhere between those two adjacent numbers. The selection process itself depends on the rounding method used, of which several are available, as previously described.

Figure 6:
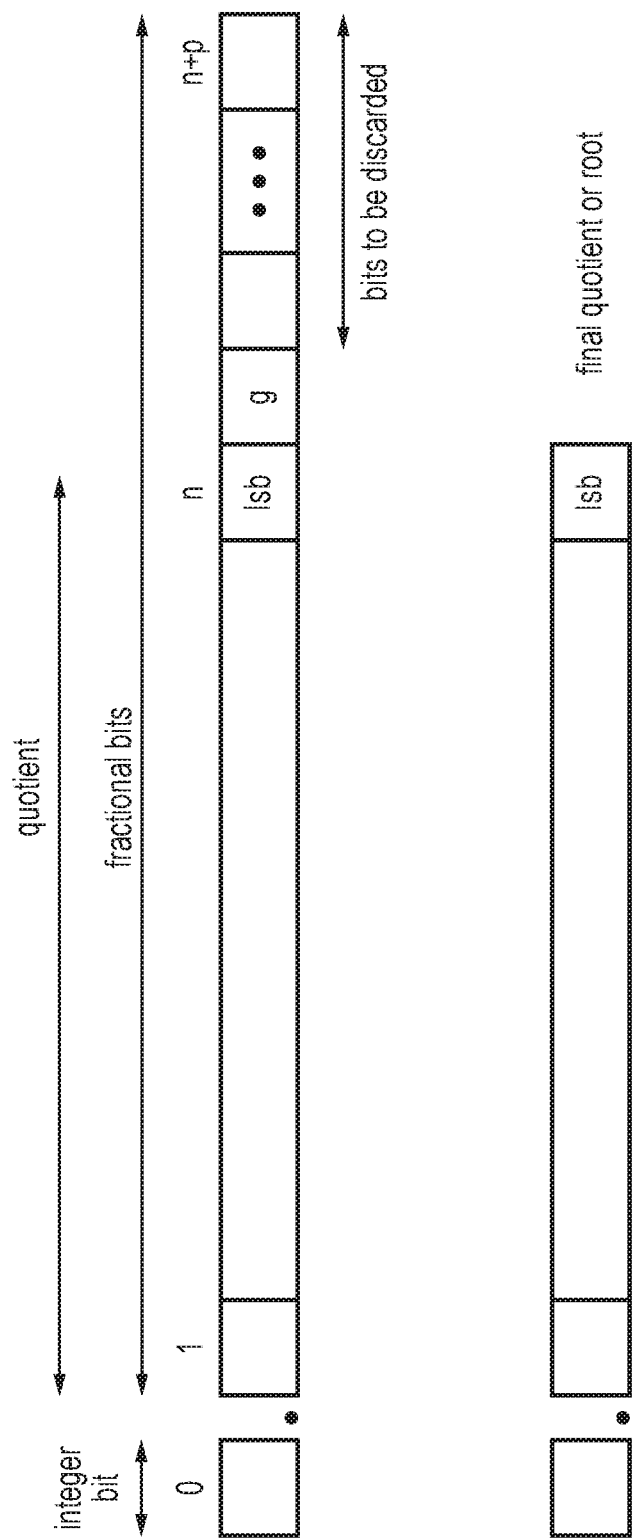
FIG. 6 shows a relationship between the output bits used in preparation for rounding in accordance with some embodiments.

As shown in FIG. 6 if the final quotient or root of, for instance, a floating-point division or square root operation has n fractional bits, from bit 1 (the most-significant bit) to bit n (the least-significant bit) then the digit-recurrence algorithm produces at least n+p fractional bits. In the case of a floating-point number, the p extra fractional bits include a guard bit (g), which is used to determine the rounding direction, and some other bits. These may be produced as a consequence of the circuitry producing more bits that are required and such bits may be discarded. In practice, the value of p (the number of extra bits) will depend on a radix of the digit recurrence circuitry. Note that the p extra bits are less significant than the least-significant bit of the quotient. In integer division, there is no guard bit, but the other bits may still be present, which are discarded. Since, for floating-point division, there is usually a guard bit, the least-significant bit is unlikely to actually have a value of 1. For instance, if there are four extra bits (including one guard bit) then a value of the position of the least-significant bit of the quotient is actually $2^4$=16. For integer division, the least significant bit could have a value of 1 if no extra bits were produced.

For the purposes of rounding, when the remainder of the division or floating-point operation is positive, the two adjacent numbers correspond with the quotient and an incremented quotient. The incremented quotient is produced by adding a +1 to a least-significant bit of the quotient (as explained above, this might actually involve adding a number other than 1). Similarly, when the remainder is negative, the two adjacent numbers correspond with (quotient−1) and incremented (quotient−1). Again, the incrementation might actually involve adding a number other than one. Hence, incremented (quotient−1) is not necessarily equal to the quotient.

Figure 7:
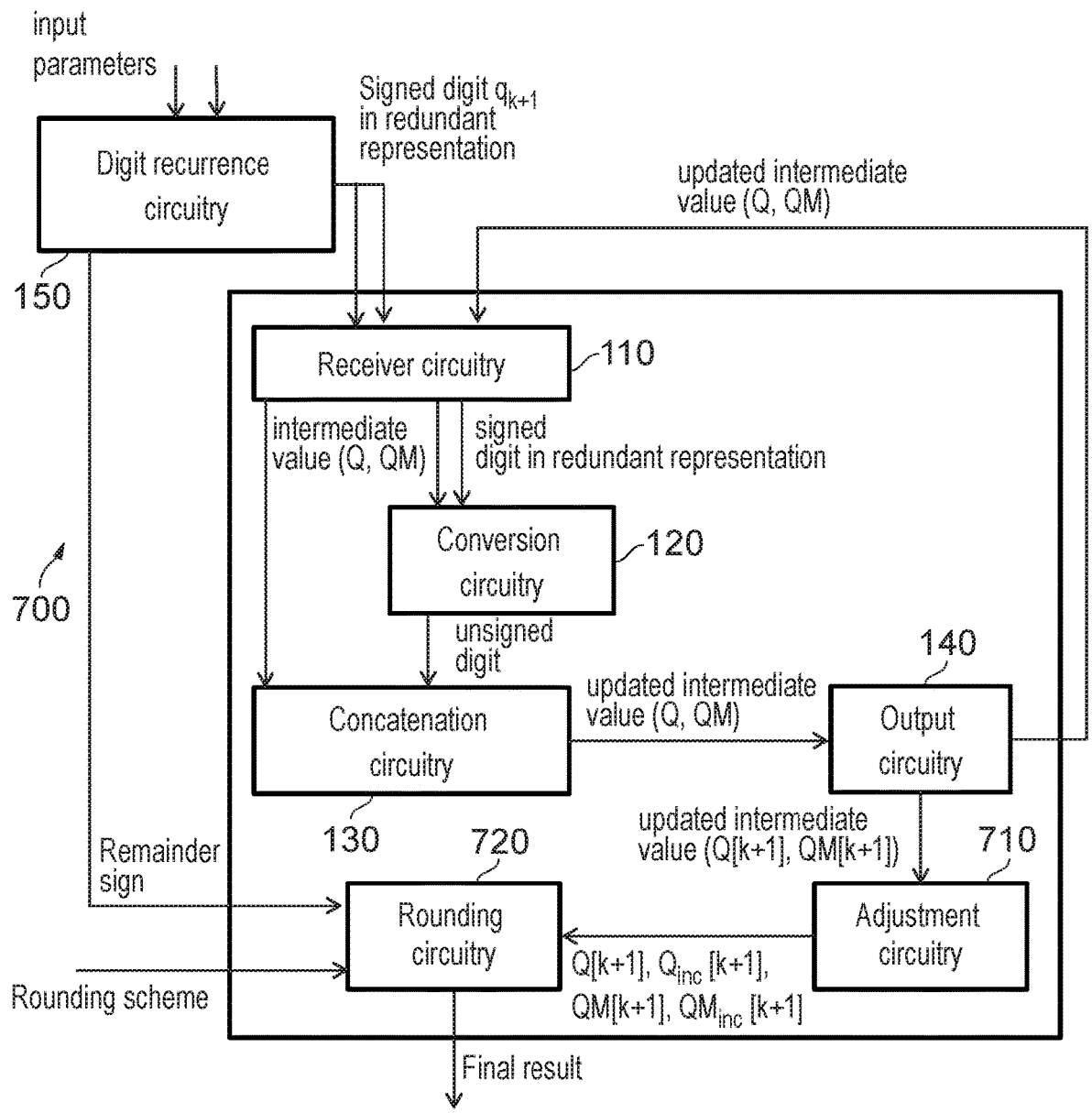
FIG. 7 schematically illustrates an apparatus in accordance with some embodiments.

FIG. 7 illustrates how this technique may be used with on-the-fly conversion. In particular, the digit recurrence circuitry 150, receiver circuitry 110, conversion circuitry 120, and concatenation circuitry 130 operate as previously described. At the output circuitry, during a final iteration, the updated intermediate value (Q[k+1], QM[k+1]) is passed to adjustment circuitry 710. Since Q[k+1] and QM[k+1] represent the quotient and the quotient−1 respectively (as of the final iteration), the adjustment circuitry 710 is able to calculate the incremented quotient $Q_{inc}$[k+1] and incremented (quotient−1) $QM_{inc}$[k+1]. The four values, Q[k+1], $Q_{inc}$[k+1], QM[k+1], and $QM_{inc}$[k+1] can therefore be provided to rounding circuitry 720 to select one of these four values in dependence on the sign of the remainder (which affects whether to use Q or QM) and the rounding scheme (which affects whether to use the incremented version or not).

Although this technique is particularly useful to on-the-fly conversion, due to Q and QM being calculated as part of the above described technique, it can be used with other techniques to efficiently perform rounding.

Incrementation can be achieved by adjusting a value of the final digit of the quotient. For instance, a digit of 2 can be treated as 3 and a digit of −3 can be treated as −2. A special situation arises where an overflow might occur (e.g. with a digit of 4) as described below.

FIG. 8A illustrates how the values of Q[k+1] and QM[k+1] are derived from the values of Q[k] and QM[k] when the quotient value is positive for a radix of 8, where k is the interation number. Since the radix is 8, there are three bits used to represent each digit.

The second and third columns show the adjustments to be made when the increment is by +1 (e.g. there are no extra bits), for each value of the final digit $q_{k+1}$ (shown in the first column). As explained above, when the final digit $q_{k+1}$ was +3 then bits "100" are concatenated to Q[k] to produce Q[k+1]. Referring back to the table 210 in FIG. 2, this corresponds with the digit of +4 (i.e. 3+1). Similarly, when the final digit $q_{k+1}$ was −3 then bits "110" are concatenated to QM[k]. Again, referring back to table 210 in FIG. 2, this corresponds with the digit of −2 (i.e. −3+1). Another way of looking at the second column of FIG. 8A is that if the final digit $q_{k+1}$ were +2 then the bits "011" (3, i.e. 2+1) are concatenated to Q[k]. Similarly, if the final digit $q_{k+1}$ were −3 then the bits "110" (−2, i.e. −3+1) are concatenated to QM[k] to produce Q[k+1] (negative numbers being concatenated to QM rather than Q). The second column shows the adjustments to be made to produce QM[k+1].

The fourth and fifth columns of FIG. 8A show the adjustments to be made when the increment is by +2 (e.g. there is one extra bit, which may be the guard bit). In this case, the final digit is made up of only two bits because the third bit becomes an extra bit. Here, the bits that are concatenated correspond with the addition of +2 to the final digit $q_{k+1}$ followed by the removal of the least-significant bit. For instance, when the final digit $q_{k+1}$ was +4, the addition of +2 gives +6 (110). The removal of the least-significant bit yields "11", which is concatenated to Q[k] to produce Q[k+1]. Similarly, when the final digit $q_{k+1}$ was +1, the addition of +2 gives +3 (011). The removal of the least-significant bit yields '01', which is concatenated to Q[k] to produce Q[k+1]. As a further example, when the final digit $q_{k+1}$ was −2, the addition of +2 gives 0 (000). The removal of the least-significant bit yields "00" which is concatenated to Q[k] to produce Q[k+1]. As a further example, when the final digit $q_{k+1}$ was −4, the addition of +2 gives −2 (110). The removal of the least-significant bit gives "11", which is concatenated to QM[k] (again since the incremented digit is negative) to produce Q[k+1]. The fourth column illustrates how the value of QM[k+1] is calculated. In particular, the bits to be concatenated correspond with the addition of +2−1 (i.e. +1) to the final digit $q_{k+1}$ followed by the removal of the least-significant bit. For instance, when the final digit $q_{k+1}$ is +1, the addition of +1 gives the digit +2 (010). The removal of the final bit then gives '01', which is concatenated to Q[k] to produce Q[k+1]. When the final digit $q_{k+1}$ is −3, the addition of +1 gives −2 (110). The loss of the least-significant bit gives '11', which is concatenated to QM[k] due to being negative to produce Q[k+1].

The fifth and sixth columns of FIG. 8A show the adjustments to be made when the increment is by +4 (e.g. there are two extra bits). The same principles as discussed above, apply. This time, the digit is incremented by +4 (+3 for QM), but in this case the least-significant two bits are removed. This time, however, a further complication can arise. In particular, when the final digit $q_{k+1}$ is +4, an increment of +4 exceeds the number of available bits—8 is "1000" in binary, which is four bits rather than three. In this case, the last two bits are removed to give "10". Here, the "0" of "10" belongs to the final digit of the quotient. The "1" belongs to the next most-significant digit and thus, in this specific case, the next-most-significant digit $q_k$ must also be incremented by 1, thereby causing Q[k] to change. QM[k] is similarly incremented. Note, however, that this 'carry' will not propagate to other digits of the quotient since the number of bits available can accommodate an increment of 1. In the case of QM when the final digit $q_{k+1}$ is +4, since the digit $q_k$ is incremented for Q[k+1], it is also incremented for QM[k+1]. However, in this case, the value of QM[k+1] is derived by concatenating '1' to QM[k]. This is because the digit +4 is incremented by +4−1=3, to give 7 ("111" in binary). Removing the least-significant two bits gives '1'.

FIG. 8B illustrates how the values of Q[k+1] and QM[k+1] are derived when the quotient value is negative for a radix of 8. As with the on-the-fly conversion, some changes are made for when the quotient value is negative. In particular, for a negative quotient the concatenation to be performed for a given digit corresponds with the concatenation to be performed when there is a positive quotient value and the given digit's sign is inverted. Note that as a consequence, the case where the next-most-significant digit must be incremented by 1 occurs, for a negative quotient, when the final digit $q_{k+1}$ was −4.

For instance, consider the situation for a negative quotient in which the increment is +2 and the final digit $q_{k+1}$ was −4. Such a concatenation corresponds with the concatenation that is performed for an increment of +2 and a final digit $q_{k+1}$ of +4 when the quotient is positive. From the table of FIG. 8A, it can be seen that the concatenation to be performed for an increment of +2 and a final digit $q_{k+1}$ of +4 for a postitive quotient is:

$Q[k+1]=\{Q[k],11\}$ $QM[k+1]=\{Q[k],10\}$

Another example is the situation in which, for a negative quotient, the increment is +1 and the final digit $q_{k+1}$ was +1. Here, the concatenation to be performed is the same as would be performed for a positive quotient when the increment is +1 and the final digit $q_{k+1}$ was −1. From the table of FIG. 8A, we can see that the concatenation to be performed for an increment of +1 and a final digit $q_{k+1}$ of −1 is:

$Q[k+1]=\{Q[k],000\}$ $QM[k+1]=\{QM[k],111\}$

Note that the tables of FIGS. 8A and 8B are specifically written with a radix of 8 in mind. However, this is not a limitation of the present technique. Higher radices would need to consider larger ranges of digits and may need to consider (depending on the circuitry) additional increments beyond +4. However, the principles shown here should be extendable to any radix. For example, the present technique could be applied to a radix of 4 (having digits +2, +1, 0, −1, and −2). If the increment is +2 then there may be a carry to the previous quotient (as is the case with an increment of +4 under radix 8).

Figure 9:
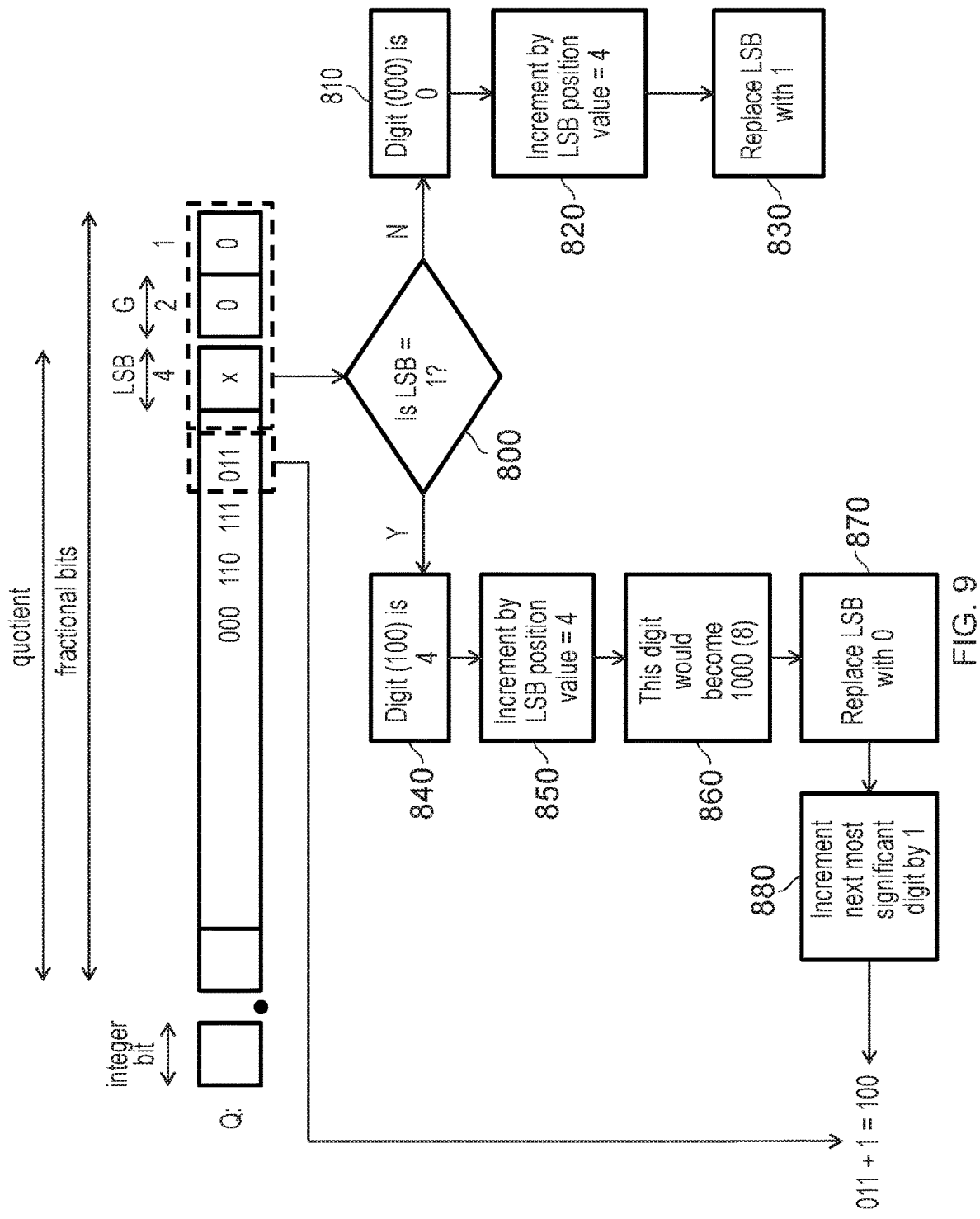
FIG. 9 illustrates a method of determining which bits to adjust for rounding in accordance with some embodiments.

FIG. 9 illustrates an example of determining the appropriate adjustments to be made for the intermediate value Q where the quotient value is positive. FIG. 9 considers a situation in which a digits are radix 8 and therefore made up from 3 (loge 8) bits. The circuitry is such that two extra bits have been produced. This might occur, for instance, if the desired precision was a double-precision floating-point number, then 52 fractional bits are required, together with one guard bit, for a total of 53 bits. If the digit-recurrence circuitry produces three bits at each iteration then 54 bits will be produced—resulting in a total of two extra bits. Consequently, the least-significant digit of the quotient will be made up from one bit in the quotient and the two extra bits, as shown in FIG. 9.

At a step 800, it is determined whether the least-significant bit of the quotient is '1' or not. If not, then, in this example, as determined in step 810, the digit is "000"=0. At step 820, the digit is incremented according to a value of the position of the least-significant bit. Here, the value is 4 ($2^2$) and so the value of the digit (0) is increased by 4 to give a total of 4 (100). In practice, since the digit only contributes one bit to the quotient, the two least-significant bits of the digit are discarded and so the least-significant bit of the quotient is set to 1. That is to say that the guard bit and the extra bits are not incremented in this process. However, the guard bit is used to determine the rounding direction and to choose between Q and $Q_{inc}$ or between QM and $QM_{inc}$ in the rounding circuitry 720.

If, at step 800, it is determined that the least-significant bit of the quotient is '1' then at step 840, it is determined that the digit (100) is 4. At a step 850, the digit is incremented according to a value of the position of the least-significant bit. Here, the value is 4 ($2^2$) and so the value of the digit (4) is increased by 4 to give a total of 8 (1000). As noted at step 860, this digit would cause an overflow. The two least-significant digits are discarded, as above. The next most-significant digit is a '0' and so the least-significant bit of the quotient is set to 0 at step 870. The remaining '1' is then carried over to the next most-significant digit, which at step 880 is incremented from "011" (3) to "100" (4).

Figure 10:
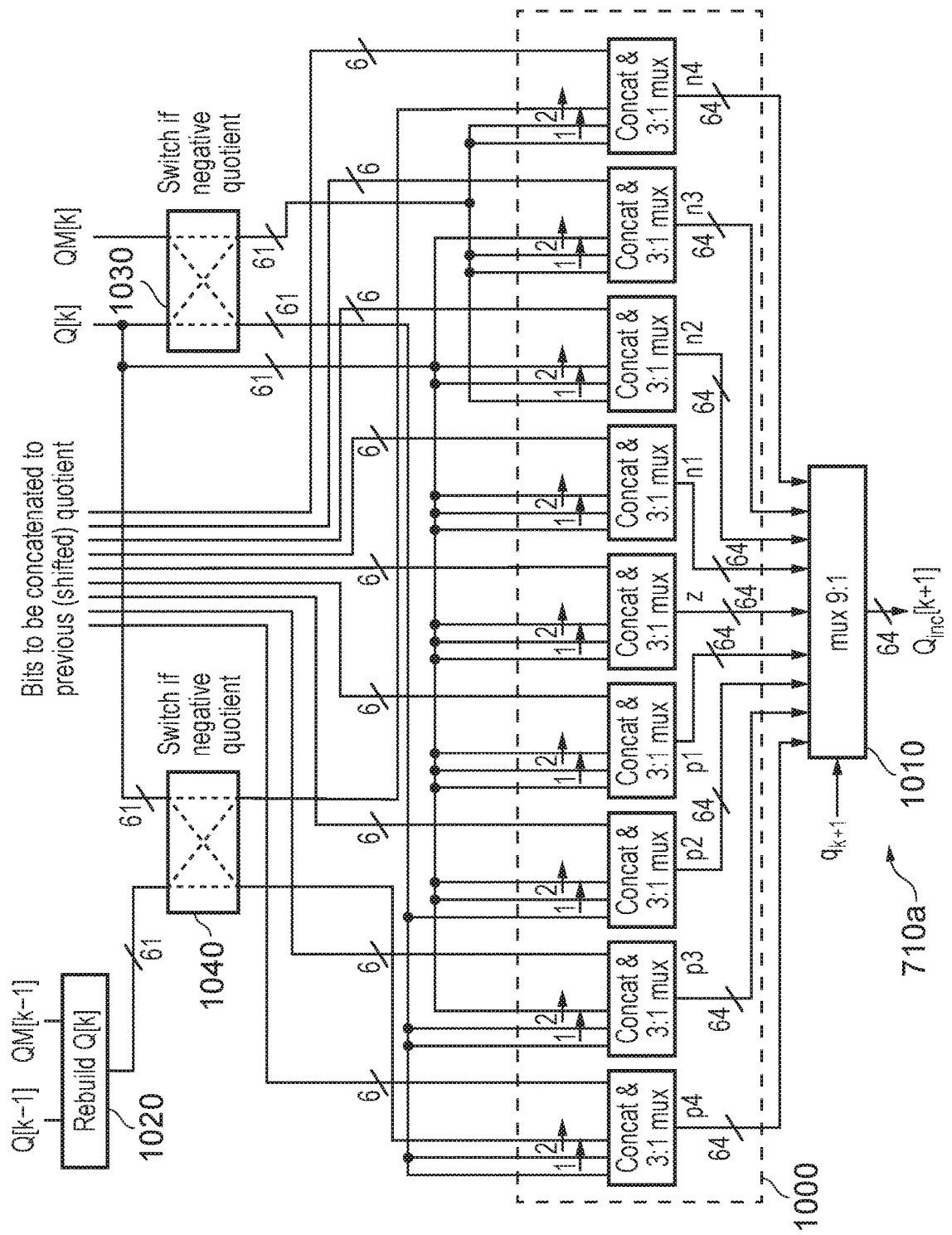
FIG. 10 illustrates an apparatus that speculatively generates candidate values for rounding in accordance with some embodiments.

FIG. 10 schematically illustrates part 710a of the adjustment circuitry 710. In particular, the circuitry 710a shown in FIG. 10 is responsible for producing the incremented value of Q. The circuitry 710a includes rebuilding circuitry 1020, which is responsible for rebuilding the value of Q[k] where a carry occurs,—e.g. for a radix of 8, this occurs in two cases: (i) the final digit $q_{k+1}$ is +4 and the incrementation is +4 when the quotient value is positive; and (ii) the final digit is −4 and the incrementation is +4 when the quotient value is negative. The circuitry also includes switching circuitry 1030 which switches the values of Q and QM where the quotient value is to be negative (as previously discussed). Further switching circuitry 1040 is used to switch the value of Q[k] and the rebuilt (incremented) Q[k] when the quotient is negative. A plurality of concatenation and mux circuits 1000 are also provided. Each of these takes three possible values for Q[k] or QM[k] as appropriate (one for an increment of +1, one for an increment of +2, and one for an increment of +4) together with a set of six bits corresponding to the concatenation to be performed for the final digit $q_{k+1}$, as illustrated in FIGS. 8A and 8B. As shown in FIGS. 8A and 8B, three bits are used for concatenation when the increment is +1, two bits are used when the increment is +2, and one bit is used when the increment is +4. Consequently, six bits can be used to indicate both the concatenation and the corresponding increment. The final digit is concatenated to each of these inputs and then the result is selected dependent on which increment is being performed. One concatenation and mux circuit is provided for each possible value of the final digit $q_{k+1}$. In a case of radix 8, these range from +4 (p4) to −4 (n4). The outputs from these circuits 1000 are then provided to an overall 9:1 multiplexer 1010, which selects from the outputs once the final digit $q_{k+1}$ is known. The size of this output is 64-bits, which supports both double precision floating point numbers and integers. In this way, the result that would be obtained for each possible value of $q_{k+1}$ is "speculatively" determined prior to $q_{k+1}$ being available and once $q_{k+1}$ is available, the correct value is chosen. Consequently, the determination of $q_{k+1}$ is removed from the critical path and the circuit need not wait to determine $q_{k+1}$ before doing further calculation based on its value.

The Q[k]/QM[k] inputs to each of the concatenation and mux circuits 1000 correspond with the parameters shown in FIGS. 8A and 8B. However, for completeness, they are as follows:

For +4 (p4), the inputs are:
For the +1 increment: Q[k] (when the quotient is positive) or QM[k] (where the quotient is negative)
For the +2 increment: Q[k] (when the quotient is positive) shifted by one bit to the right or QM[k] (when the quotient is negative) shifted by one bit to the right
For the +4 increment: An updated version of Q[k] produced by the rebuilding circuitry 1020 (when the quotient is positive), shifted two bits to the right or Q[k] itself (when the quotient is negative) shifted two bits to the right For +3 (p3), the inputs are:
For the +1 increment: Q[k] (where the quotient is positive) or QM[k] (where the quotient is negative)
For the +2 increment: Q[k] (where the quotient is positive) shifted by one bit to the right or QM[k] (where the quotient is negative) shifted by one bit to the right
For the +4 increment: Q[k] shifted by two bits to the right For +2 (p2), the inputs are:
For the +1 increment: Q[k] (where the quotient is positive) or QM[k] (where the quotient is negative)
For the +2 increment: Q[k] shifted by one bit to the right
For the +4 increment: Q[k] shifted by two bits to the right For +1 (p1), the inputs are:
For the +1 increment: Q[k]
For the +2 increment: Q[k] shifted by one bit to the right
For the +4 increment: Q[k] shifted by two bits to the right For +0 (z), the inputs are:
For the +1 increment: Q[k]
For the +2 increment: Q[k] shifted by one bit to the right
For the +4 increment: Q[k] shifted by two bits to the right For −1 (n1), the inputs are:
For the +1 increment: Q[k]
For the +2 increment: Q[k] shifted by one bit to the right
For the +4 increment: Q[k] shifted by two bits to the right For −2 (n2), the inputs are
For the +1 increment: QM[k] (where the quotient is positive) or Q[k] (where the quotient is negative)
For the +2 increment: Q[k] shifted by one bit to the right
For the +4 increment: Q[k] shifted by two bits to the right For −3 (n3), the inputs are
For the +1 increment: QM[k] (where the quotient is positive) or Q[k] (where the quotient is negative)
For the +2 increment: QM[k] (where the quotient is positive) shifted by one bit to the right or Q[k] (where the quotient is negative) shifted by one bit to the right
For the +4 increment: Q[k] shifted by two bits to the right For −4 (n4), the inputs are
For the +1 increment: QM[k] (where the quotient is positive) or Q[k] (where the quotient is negative)
For the +2 increment: QM[k] (where the quotient is positive) shifted by one bit to the right or Q[k] (where the quotient is negative) shifted by one bit to the right
For the +4 increment: Q[k] shifted two bits to the right (when the quotient is positive), or an updated version of Q [k] produced by the rebuilding circuitry 1020 (when the quotient is negative), shifted two bits to the right In each case, the shifting is performed in order to trim the extra bits from Q[k] and QM[k].

FIG. 10 is provided for the specific example of a radix of 8 and for the generation of $Q_{inc}[k+1]$. It will be appreciated that the present technique can be extended to any radix. As a consequence, the range of digits (and so the number of concatenation and mux circuits 1000 will increase to handle the additional digits. In addition, if the possible number of extra bits increases then the number of inputs to each of those concatenation and mux circuits 1000 may also increase.

Figure 11:
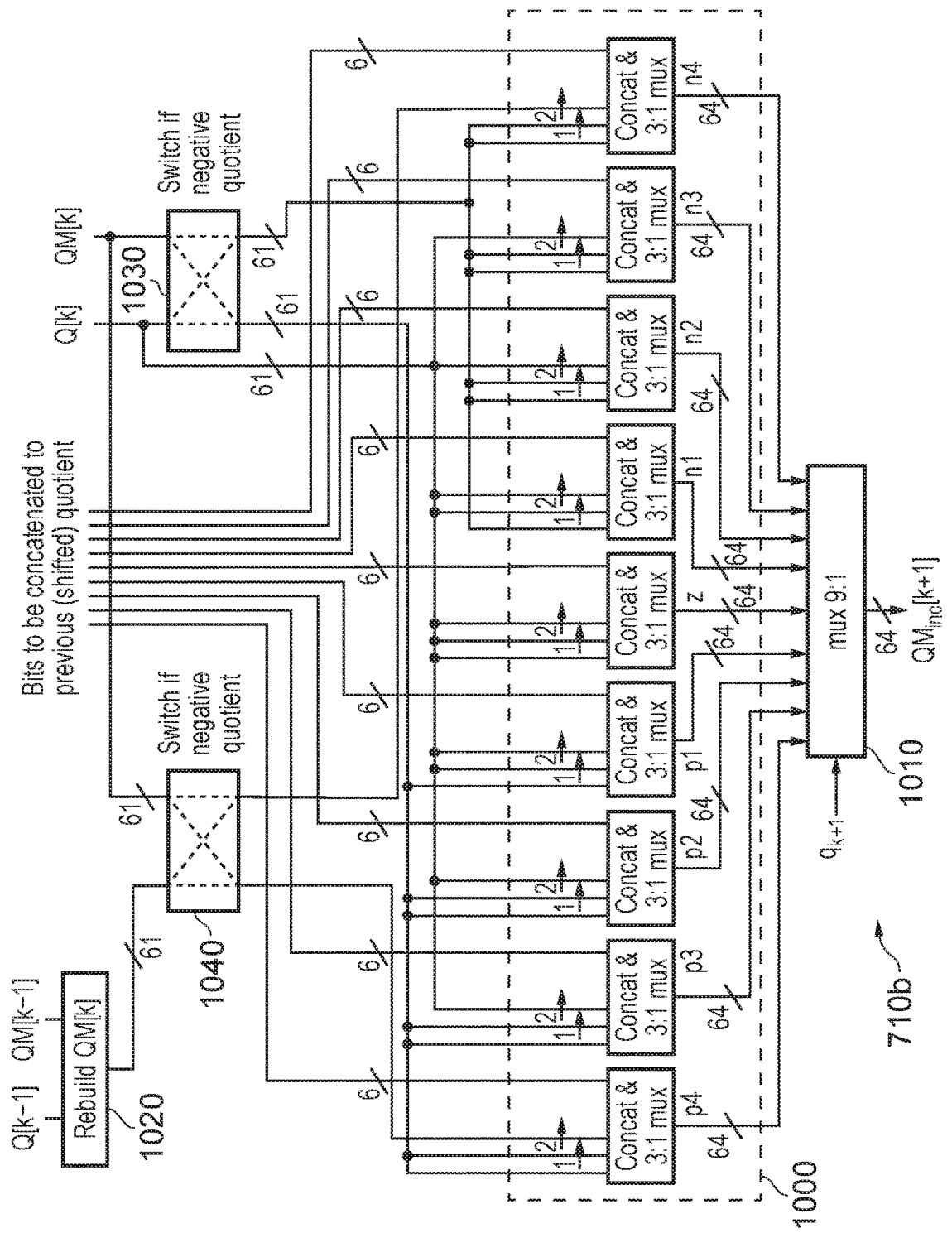
FIG. 11 illustrates an apparatus that speculatively generates candidate values for rounding in accordance with some embodiments.

FIG. 11 illustrates the generation of $QM_{inc}[k+1]$, which is similar to the circuitry shown in repect of FIG. 10. In this circuitry, the rebuilding circuitry 1020 is responsible for rebuilding the value of QM[n]. Some of the other inputs to the concatenation and mux circuits 1000 will also be different as illustrated with respect to FIGS. 8A and 8B.

Figure 12:
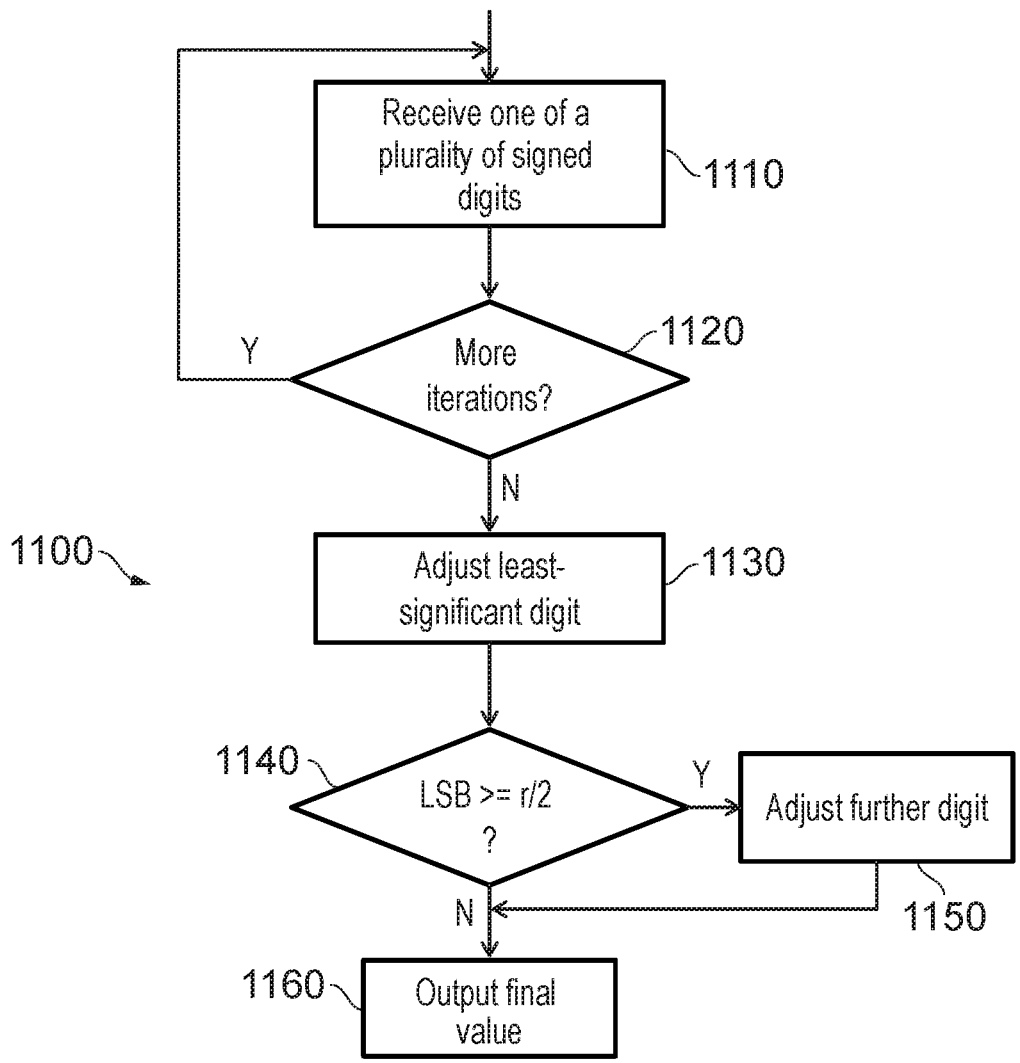
FIG. 12 shows a flowchart that illustrates a method of data processing in accordance with some embodiments.

FIG. 12 illustrates a method of data processing in accordance with some embodiments. At a step 1110, one of a plurality of digits is received. At step 1120, it is determined whether there are more iterations to go. If so, then the process returns to step 1110 where one or more further iterations take place. At a step 1130, a least significant digit of the quotient is adjusted. If, at step 1140, it is determined that a position of a least-significant bit of the quotient is greater than or equal to the radix divided by two, then at step 1150 a further digit is adjusted. The process then proceeds to step 1160 where a final value is output. If the condition in step 1140 is not met, then the process proceeds straight to step 1160 where a final value is output.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. A data processing apparatus to convert a plurality of signed digits to an output value, the data processing apparatus comprising:
receiver circuitry to receive, at each of a plurality of iterations, one of the plurality of signed digits, each of the signed digits comprising a number of bits dependent on a radix, wherein the signed digits are used to form an unrounded output value followed by zero or more extra bits;
adjustment circuitry to adjust a least-significant digit of the unrounded output value to produce an incremented unrounded output value after the plurality of iterations; and
rounding circuitry to select from among the unrounded output value and the incremented unrounded output value to produce the output value, wherein
the adjustment circuitry is adapted, when a value of a position of a least-significant bit of the unrounded output value is greater than or equal to the radix divided by two, to adjust a subset of the digits of the unrounded output value.

2. The data processing apparatus according to claim 1, wherein
the subset comprises at most two of the digits of the unrounded output value.

3. The data processing apparatus according to claim 2, wherein
the two digits of the unrounded output value comprise the least-significant digit of the unrounded output value and a second-least-significant digit of the unrounded output value.

4. The data processing apparatus according to claim 1, wherein
the adjustment circuitry is adapted, when the value of the position of the least-significant bit is less than the radix divided by two, to adjust at most the least-significant digit of the unrounded output value.

5. The data processing apparatus according to claim 1, wherein
the adjustment circuitry is adapted, when a value of a position of a least-significant bit of the unrounded output value is greater than or equal to the radix divided by two and the least-significant bit of the unrounded output value is '1', to adjust the subset of the digits of the unrounded output value, and otherwise to adjust the least-significant digit of the unrounded output value.

6. The data processing apparatus according to claim 1, wherein
the signed digits are in redundant representation.

7. The data processing apparatus according to claim 1, wherein
the least-significant digit of the unrounded output value comprises the least-significant bit of the unrounded output value and the zero or more extra bits.

8. The data processing apparatus according to claim 1, comprising:
conversion circuitry to perform a negative-output conversion from the one of the signed digits to one of a plurality of unsigned digits, such that the unsigned digits are used to form the unrounded output value followed by zero or more extra bits;
concatenation circuitry to concatenate bits of the one of the unsigned digits and bits of previous intermediate data to produce updated intermediate data; and
output circuitry to provide the updated intermediate data as the previous intermediate data of a next iteration and to provide the updated intermediate data as the unrounded output value after the plurality of iterations, wherein
the receiver circuitry is adapted to also receive, at each of the plurality of iterations, the previous intermediate data.

9. The data processing apparatus according to claim 8, wherein:
the receiver circuitry is adapted to also receive an indication of whether the unrounded output value is to be negative;
the conversion circuitry is adapted to perform a positive-output conversion from the one of the signed digits to the one of the unsigned digits, such that the unrounded output value is positive; and
the conversion circuitry is adapted to select between the negative-output conversion and the positive-output conversion in dependence on the indication.

10. The data processing apparatus according to claim 9, comprising:
selection circuitry to speculatively generate, based on the indication, prior to the one of the signed digits being received, a set of candidate unsigned digits for each possible value of the signed digit, and to select the unsigned digit from the set of candidate unsigned digits once the signed digit is received; and
the selection circuitry is adapted to select the one of the unsigned digits that corresponds with the one of the signed digits from the candidate unsigned digits.

11. The data processing apparatus according to claim 9, wherein
the intermediate data comprises a first value and a second value;
the conversion circuitry is adapted to perform a further negative-output conversion from the one of the signed digits to a further unsigned digit, and to perform a further positive-output conversion from the one of the signed digits to the further unsigned digit;
the conversion circuitry is adapted to select between the further negative-output conversion and the further positive-output conversion in dependence on the indication; and
the updated intermediate data comprises an updated first value and an updated second value.

12. The data processing apparatus according to claim 11, wherein
the adjustment circuitry is adapted to adjust a least significant digit of each of the first value and the second value to produce the incremented unrounded output value comprising an incremented first value and an incremented second value; and
the rounding circuitry is adapted to select from among the first value, the incremented first value, the second value, and incremented second value.

13. The data processing apparatus according to claim 11, wherein
the concatenation circuitry is adapted:
if the one of the signed digits is zero and the indication indicates that the output value is to be negative, to produce the updated first value by concatenating the first value with the one of the unsigned digits and to produce the updated second value by concatenating the second value with the further unsigned digit, and otherwise to produce the updated first value by concatenating one of the first value and the second value with the unsigned digit and to produce the updated second value by concatenating the one of the first value and the second value with the further unsigned digit.

14. The data processing apparatus according to claim 13, wherein
the one of the first value and the second value is dependent on whether the signed digit is positive or negative and the indication.

15. The data processing apparatus according to claim 8, wherein
the conversion circuitry performs the conversion without addition circuitry.

16. The data processing apparatus according to claim 1, wherein
the rounding circuitry performs the rounding without addition circuitry.

17. The data processing apparatus according to claim 1, comprising:
digit recurrence circuitry to perform a digit recurrence operation to produce the plurality of signed digits, wherein in each of the plurality of iterations, one of the plurality of signed digits is provided to the receiver circuitry.

18. The data processing apparatus according to claim 1, wherein
the output value is an integer.

19. A data processing method to convert, using a data processing apparatus including receiver circuitry, adjustment circuitry and rounding circuitry, a plurality of signed digits to an output value, the method comprising:
receiving, by the receiver circuitry, at each of a plurality of iterations, one of the plurality of signed digits, each of the signed digits comprising a number of bits dependent on a radix, wherein the signed digits are used to form an unrounded output value followed by zero or more extra bits;
adjusting, by the adjustment circuitry, significant digit of the unrounded output value to produce an incremented unrounded output value after the plurality of iterations; and
selecting, by the rounding circuitry, from among the unrounded output value and the incremented unrounded output value to produce the output value, wherein
when a value of a position of a least-significant bit of the unrounded output value is greater than or equal to the radix divided by two, a subset of the digits of the unrounded output value are adjusted by the adjustment circuitry.

20. A data processing apparatus to convert a plurality of signed digits to an output value, the data processing apparatus comprising:
means for receiving, at each of a plurality of iterations, one of the plurality of signed digits, each of the signed digits comprising a number of bits dependent on a radix, wherein the signed digits are used to form an unrounded output value followed by zero or more extra bits;
means for adjusting a least-significant digit of the unrounded output value to produce an incremented unrounded output value after the plurality of iterations; and
means for selecting from among the unrounded output value and the incremented unrounded output value to produce the output value, wherein
when a value of a position of a least-significant bit of the unrounded output value is greater than or equal to the radix divided by two, a subset of the digits of the unrounded output value are adjusted.

* * * * *